(12) United States Patent
Li et al.

(10) Patent No.: US 11,636,694 B2
(45) Date of Patent: Apr. 25, 2023

(54) VIDEO-BASED ACTIVITY RECOGNITION

(71) Applicant: QUALCOMM Incorporated, San Diego, CA (US)

(72) Inventors: Xin Li, San Diego, CA (US); Chun-Ting Huang, San Diego, CA (US); Lei Wang, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 17/185,800

(22) Filed: Feb. 25, 2021

(65) Prior Publication Data

US 2022/0076039 A1    Mar. 10, 2022

Related U.S. Application Data

(60) Provisional application No. 63/076,827, filed on Sep. 10, 2020.

(51) Int. Cl.
*G06K 9/62* (2022.01)
*G06V 20/59* (2022.01)
*G06V 20/40* (2022.01)
*G06F 18/214* (2023.01)
*G06F 18/20* (2023.01)

(52) U.S. Cl.
CPC .......... *G06V 20/597* (2022.01); *G06F 18/214* (2023.01); *G06F 18/285* (2023.01); *G06V 20/40* (2022.01)

(58) Field of Classification Search
CPC ........... G06T 2207/30268; G06T 2207/20084; G06T 3/4046; G06T 9/002; G06V 10/62; G06V 20/44; G06V 20/597; G06V 10/82; G06V 10/454; G06V 10/95; G06N 20/00–20/20; G06N 3/0454; G06N 3/08–3/0985
See application file for complete search history.

(56) References Cited

U.S. PATENT DOCUMENTS

| 2019/0213406 | A1 | 7/2019 | Porikli et al. |
| 2020/0089977 | A1 | 3/2020 | Lakshmi Narayanan et al. |
| 2020/0242382 | A1* | 7/2020 | Yin ...................... G06K 9/6256 |
| 2021/0182625 | A1* | 6/2021 | Arar ...................... G06N 20/00 |

OTHER PUBLICATIONS

International Search Report and Written Opinion—PCT/US2021/046340—ISA/EPO—dated Nov. 29, 2021.

* cited by examiner

*Primary Examiner* — Brian Werner
(74) *Attorney, Agent, or Firm* — Polsinelli/Qualcomm

(57) ABSTRACT

Systems and techniques are provided for performing video-based activity recognition. For example, a process can include extracting, using a first machine learning model, first one or more features from a first frame and second one or more features from a second frame. The first one or more features and the second one or more features are associated with a person driving a vehicle. The process can include processing, using a second machine learning model, the first one or more features and the second one or more features. The process can include determining, based on processing of the first one or more features and the second one or more features using the second machine learning model, at least one activity associated with the person driving the vehicle.

30 Claims, 18 Drawing Sheets

VIDEO-BASED ACTIVITY RECOGNITION

CROSS-REFERENCE TO RELATED APPLICATIONS

This application claims the benefit of U.S. Provisional Application No. 63/076,827, filed Sep. 10, 2020, which is hereby incorporated by reference, in its entirety and for all purposes.

FIELD

The present disclosure generally relates to activity detection or recognition. In some examples, aspects of the present disclosure are related to systems and techniques for performing video-based activity recognition.

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

A vehicle is an example of a device that can include one or more cameras. For instance, a vehicle can include one or more cameras that can capture frames of the interior of the vehicle and/or can include one or more cameras that can capture frames of the exterior of the vehicle. The frames can be processed for various purposes, such as for determining or recognizing activities being performed by a driver and/or passenger of the vehicle, for recognizing an identity of a person in the vehicle, for identifying other vehicles, objects, and/or obstacles in proximity to the vehicle, among others.

BRIEF SUMMARY

In some examples, systems and techniques are described for performing video-based activity recognition for determining or recognizing one or more activities of a driver of a vehicle. According to at least one illustrative example, a method of processing one or more frames is provided. The method includes: extracting, using a first machine learning model, first one or more features from a first frame and second one or more features from a second frame, the first one or more features and the second one or more features being associated with a person driving a vehicle; processing, using a second machine learning model, the first one or more features and the second one or more features; and determining, based on processing of the first one or more features and the second one or more features using the second machine learning model, at least one activity associated with the person driving the vehicle.

In another example, an apparatus for processing one or more frames is provided that includes a memory configured to store at least one frame and one or more processors (e.g., implemented in circuitry) coupled to the memory. The one or more processors are configured to and can: extract, using a first machine learning model, first one or more features from a first frame and second one or more features from a second frame, the first one or more features and the second one or more features being associated with a person driving a vehicle; process, using a second machine learning model, the first one or more features and the second one or more features; and determine, based on processing of the first one or more features and the second one or more features using the second machine learning model, at least one activity associated with the person driving the vehicle.

In another example, a non-transitory computer-readable medium is provided that has stored thereon instructions that, when executed by one or more processors, cause the one or more processors to: extract, using a first machine learning model, first one or more features from a first frame and second one or more features from a second frame, the first one or more features and the second one or more features being associated with a person driving a vehicle; process, using a second machine learning model, the first one or more features and the second one or more features; and determine, based on processing of the first one or more features and the second one or more features using the second machine learning model, at least one activity associated with the person driving the vehicle.

In another example, an apparatus for processing one or more frames is provided. The apparatus includes: means for extracting, using a first machine learning model, first one or more features from a first frame and second one or more features from a second frame, the first one or more features and the second one or more features being associated with a person driving a vehicle; means for processing, using a second machine learning model, the first one or more features and the second one or more features; and means for determining, based on processing of the first one or more features and the second one or more features using the second machine learning model, at least one activity associated with the person driving the vehicle.

In some aspects, the first frame occurs before the second frame in a sequence of frames.

In some aspects, the first one or more features are extracted at a first time and the second one or more features are extracted at a second time occurring after the first time.

In some aspects, the method, apparatuses, and computer-readable medium described above further comprise: generating a combined feature representation by combining the first one or more features and the second one or more features. In some cases, the at least one activity associated with the person driving the vehicle is determined based on processing of the combined feature representation using the second machine learning model. In some aspects, the combined feature representation includes a feature vector. In some aspects, the feature vector includes a two-dimensional feature vector. In some aspects, combining the first one or more features and the second one or more features includes concatenating the first one or more features and the second one or more features.

In some aspects, the method, apparatuses, and computer-readable medium described above further comprise: storing the first one or more features and the second one or more features in a storage device.

In some aspects, the method, apparatuses, and computer-readable medium described above further comprise: obtaining, from the storage device, the first one or more features and the second one or more features; and extracting, using the first machine learning model, third one or more features from a third frame, the third one or more features being associated with the person driving the vehicle. In some cases, the at least one activity associated with the person driving the vehicle is determined based on processing of the first one or more features, the second one or more features, and the third one or more features using the second machine learning model.

In some aspects, the method, apparatuses, and computer-readable medium described above further comprise: storing the third one or more features in the storage device; and removing features from the storage device based on storing the third one or more features in the storage device.

In some aspects, the method, apparatuses, and computer-readable medium described above further comprise generating a combined feature representation by combining the first one or more features, the second one or more features, and the third one or more features. In some cases, the at least one activity associated with the person driving the vehicle is determined based on processing of the combined feature representation using the second machine learning model.

In some aspects, processing of the first one or more features and the second one or more features using the second machine learning model includes: determining, using the second machine learning model, a classification associated with the first one or more features and the second one or more features, the classification being indicative of the at least one activity.

In some aspects, the first machine learning model includes a neural network.

In some aspects, the second machine learning model includes a convolutional neural network. In some aspects, the convolutional neural network includes a two-dimensional convolutional neural network.

In some aspects, the method, apparatuses, and computer-readable medium described above further comprise outputting a notification based on the at least one activity. In some aspects, the notification includes a visual notification. In such aspects, outputting the notification can include displaying the visual notification. In some aspects, the notification includes an audible notification. In such aspects, outputting the notification can include outputting the audible notification using at least one speaker of the vehicle.

In some aspects, one or more of the apparatuses described above is or is part of a vehicle (e.g., a computing device of a vehicle), a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, an apparatus includes a camera or multiple cameras for capturing one or more images. In some aspects, the apparatus further includes a display for displaying one or more images, notifications, and/or other displayable data. In some aspects, the apparatus can include one or more sensors, which can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Driver activities or behaviors are key factors that can affect the safe operation of a vehicle. In some cases, a driver monitoring system (DMS) can be used to monitor and understand characteristics of one or more drivers of a vehicle. Examples of such characteristics can include one or more activities of a driver, an intent of the driver to perform an action, and/or other characteristics of the driver. For instance, the DMS can detect or recognize various activities being performed by a driver. FIG. 1A-FIG. 1K are images illustrating different activities being performed by a driver.

Figure 1A:
FIG. 1A-FIG. 1L are images of a driver of a vehicle, in accordance with some examples.
Figure 1B:
Figure 1C:
Figure 1D:
Figure 1E:
Figure 1F:
Figure 1G:
Figure 1H:
Figure 1I:
Figure 1J:
Figure 1K:
Figure 1L:

FIG. 1A is an image 102 illustrating a driver performing a normal driving activity (e.g., looking directly out of the windshield, both hands on the steering wheel, not distracted, etc.). FIG. 1B is an image 104 illustrating the driver using a mobile device. FIG. 1C is an image 106 illustrating the driver drinking a beverage. FIG. 1D is an image 108 illustrating the driver smoking a cigarette. FIG. 1E is an image 110 illustrating the driver with both hands off the steering wheel. FIG. 1F is an image 112 illustrating the driver with an arm out of the driver's side window. FIG. 1G is an image 114 illustrating the driver yawning. FIG. 1H is an image 116 illustrating the driver looking up toward the ceiling of the vehicle. FIG. 1I is an image 118 illustrating the driver looking down toward the driver's lap. FIG. 1J is an image 120 illustrating the driver looking left. FIG. 1K is an image 122 illustrating the driver looking right. FIG. 1L is an image 124 illustrating the driver with no seat belt fastened.

In some cases, the DMS can use the information associated with the characteristics of a driver (e.g., an activity being performed by the driver) to perform one or more functions, such as generating a suitable notification or alert for the driver's attention, performing an automated vehicle operation function (e.g., automatically breaking the vehicle, changing lanes, maintaining a heading, etc.), sending a message to one or more other vehicles, and/or other functions. For instance, the DMS can output a notification based on a particular activity being performed by the driver. In one example, based on detecting the driver is looking to the left, right, up, or down, the DMS can generate and output a notification indicating that the driver appears to be distracted. In another example, based on detecting the driver has their eyes closed, the DMS can generate and output a notification indicating that the driver appears to be drowsy. In some examples, the DMS can identify that a particular activity being performed by the driver is at risk of affecting road safety. In some cases, the DMS can output a notification alerting the driver to be cautious and resume attention back to road conditions, can send a message to one or more other vehicles, and/or perform any other suitable function based on determining the activity may cause unsafe conditions.

Systems and techniques are needed for accurately and more efficiently detecting or recognizing activities of drivers. For example, many vehicular accidents are caused by activities being performed by human drivers that are outside of normal driving behavior. By accurately recognizing when a driver's activity is outside of normal driving behavior, notifications or alerts can be output for the user's attention. Such notifications can reduce the rate of vehicular accidents. Further, by performing accurate activity detection or recognition in an efficient manner, the computing and power resources of the vehicle can be conserved for other operations.

Systems, apparatuses, processes (also referred to as methods), and computer-readable media (collectively referred to as "systems and techniques") are described herein for performing activity recognition for detecting or recognizing one or more activities of a driver of a vehicle based on a sequence of frames. The sequence of frames can be a video, a group of consecutively captured images, or other sequence of frames. In some examples, the systems and techniques are described herein as performing a video-based activity recognition. However, the systems and techniques can be applied to any sequence of frames or images. As described in more detail below, an activity recognition system can include a feature extraction machine learning model (or machine learning system) and an activity recognition machine learning model (or machine learning system). The feature extraction machine learning model can be trained to learn spatial information (e.g., features) associated with the frames. In some cases, the feature extraction machine learning model can be trained using images and labels as training data. During inference (after the feature extraction machine learning model has been trained), the feature extraction machine learning model can extract features associated with the driver from a sequence of frames. In some cases, the feature extraction machine learning model can process each frame of the sequence of frames as each frame is captured and/or processed by the image capture device. The output of the feature extraction machine learning model can include a feature vector or other feature representation for each frame.

The activity recognition machine learning model can be trained to learn temporal information associated with the frames through frame-to-frame relationships, which can allow the activity recognition machine learning model to identify or classify different activities based on features extracted from a number of frames. In one illustrative example, the activity recognition machine learning model can learn temporal information among three combinations of frames from the threshold number of frames, including two frames, three frames, and four frames as the time interval feature (or "interval feature"). The interval feature derives the time correlation of different numbers of frames. In one illustrative example using two frames, the interval features learned from the two frames will focus on features that change (e.g., have a changing delta) across the two frames. In another illustrative example using four frames, the interval features learned from the four frames will have a changing delta across a longer window (across the four frames) as compared to the two frames.

In some examples, a storage or memory device (e.g., as part of the activity recognition system) can be used to store the features extracted from the frames by the feature extraction machine learning model. In some cases, the storage or memory device can store features extracted from a threshold number of frames (e.g., features extracted from five frames, six frames, ten frames, or any other number of frames). The features input to the activity recognition machine learning model can be obtained from the memory or storage device (e.g., from a buffer).

In some examples, the features extracted from multiple frames (and in some cases stored in the storage or memory device) can be stacked or combined into one single feature representation (e.g., a two-dimensional (2D) feature vector), referred to as a combined feature representation. The combined feature representation can be provided as input to the activity recognition machine learning model. For example, the activity recognition machine learning model can use the combined feature representation as input to identify or classify a driving-related activity being performed by the driver (e.g., one or more of the activities illustrated in FIG. 1A-FIG. 1L and/or other activities).

In some examples, the feature extraction machine learning model is a neural network or a combination of multiple neural network architectures. In one example, the neural network includes a MobileNetV2 neural network architecture, described in Mark Sandler et al., "MobileNetV2:

Inverted Residuals and Linear Bottlenecks," 2019, which is hereby incorporated by reference in its entirety and for all purposes. In some examples, the activity recognition machine learning model is a convolutional neural network (CNN), such as a two-dimensional (2D) CNN. In some examples, as described below, a three-stage training process can be used to train the feature extraction machine learning model and the activity recognition machine learning model. The three-stage training process can include training the feature extraction machine learning model first until a certain accuracy level is achieved, then training the activity recognition machine learning model using the trained feature extraction machine learning model with frozen weights, and then performing an end-to-end training of the feature extraction machine and activity recognition learning systems.

Using the activity recognition systems and techniques described herein, a driver monitoring system (DMS) or other system of a vehicle can intelligently interact with human drivers and/or perform other functions based on detected activity. By using separate feature extraction and activity recognition machine learning models, the activity recognition system needs to process (e.g., run inference on) a particular frame only once (as opposed to multiple times), allowing the system to achieve low system overhead and reduced bandwidth. For instance, the features extracted from a frame by the feature extraction machine learning model can be stored in the memory or storage device noted above. The features can then be used multiple times by the activity recognition machine learning model when processing features for different combinations of frames.

While examples are described herein for detecting activities of a driver of a vehicle, the activity recognition systems and techniques described herein can be used to detect activities of other people in a vehicle. In some examples, the activity recognition systems and techniques described herein can be used to determine activities of people or objects in other environments other than vehicles, such as a person sitting a desk in front of a computer, a person holding a mobile device, a robotics device in a factory environment, and/or any other object and/or environment.

Figure 2:
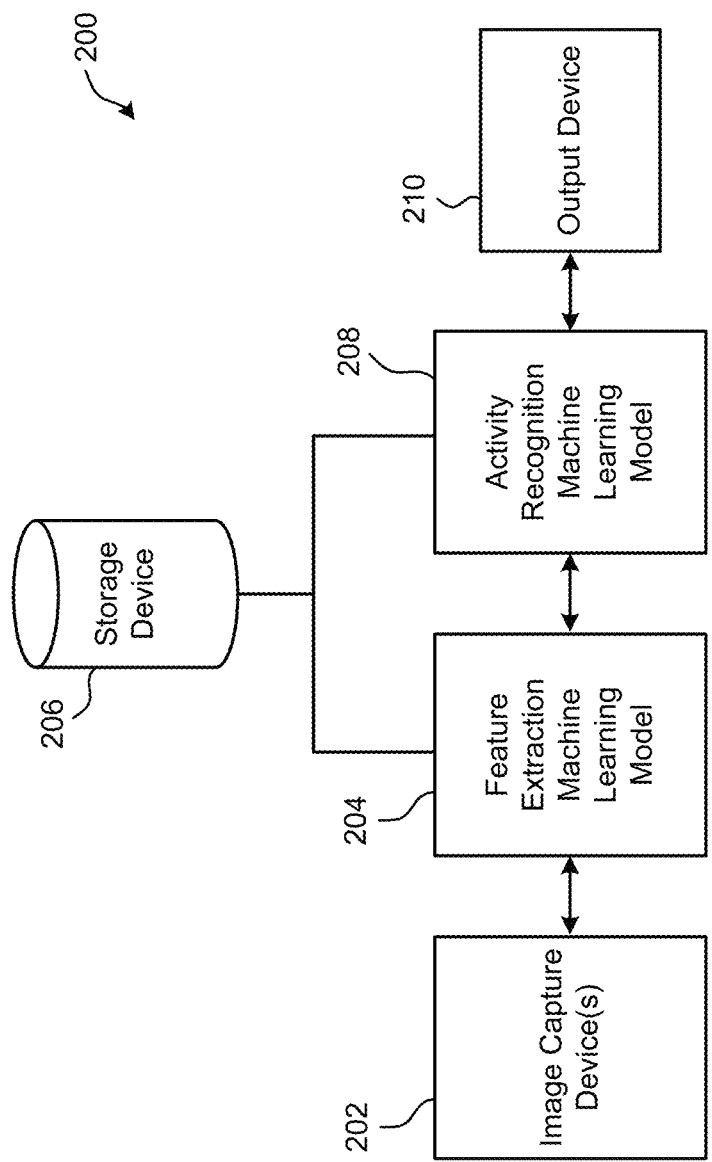
FIG. 2 is a block diagram illustrating an example of an activity recognition system, in accordance with some examples.

Various aspects of the techniques described herein will be discussed below with respect to the figures. FIG. 2 is a block diagram illustrating an example of an activity recognition system 200. The activity recognition system 200 includes various components that are used to process a sequence of frames of a driver of a vehicle and detect or recognize activities performed by the driver. As shown, the components of the activity recognition system 200 include one or more image capture devices 202, a feature extraction machine learning model 204, a storage device 206, an activity recognition machine learning model 208, and an output device 210.

The activity recognition system 200 can include or be part of a vehicle. For example, the activity recognition system 200 can include or be part of an electronic device or system of the vehicle (e.g., a driver monitoring system (DMS)). In other implementations, the activity recognition system 200 can be part of a mobile or stationary telephone handset (e.g., smartphone, cellular telephone, or the like), a server computer (e.g., in communication with a vehicle computing system), a desktop computer, a laptop or notebook computer, a tablet computer, a set-top box, a television, a camera, a display device, a digital media player, a video streaming device, or any other suitable electronic device. In some examples, the activity recognition system 200 can include one or more wireless transceivers (or separate wireless receivers and transmitters) for wireless communications, such as cellular network communications, 802.11 Wi-Fi communications, wireless local area network (WLAN) communications, Bluetooth or other short-range communications, any combination thereof, and/or other communications. In some implementations, the components of the activity recognition system 200 (e.g., the one or more image capture devices 202, the feature extraction machine learning model 204, the storage device 206, the activity recognition machine learning model 208, and the output device 210) can be part of the same computing device. In some implementations, the components of the activity recognition system 200 can be part of two or more separate computing devices. In some cases, the activity recognition system 200 can be implemented as part of the computing system 1200 shown in FIG. 12.

While the activity recognition system 200 is shown to include certain components, one of ordinary skill will appreciate that the activity recognition system 200 can include more components or fewer components than those shown in FIG. 2. In some cases, additional components of the activity recognition system 200 can include software, hardware, or one or more combinations of software and hardware. For example, in some cases, the activity recognition system 200 can include one or more other sensors (e.g., one or more inertial measurement units (IMUs), radars, light detection and ranging (LIDAR) sensors, audio sensors, etc.), one or more display devices, one or more other processing engines, one or more other hardware components, and/or one or more other software and/or hardware components that are not shown in FIG. 2. In some implementations, additional components of the activity recognition system 200 can include and/or can be implemented using electronic circuits or other electronic hardware, which can include one or more programmable electronic circuits (e.g., digital signal processors (DSPs), microprocessors, microcontrollers, graphics processing units (GPUs), central processing units (CPUs), any combination thereof, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the activity recognition system 200.

The one or more image capture devices 202 can capture a sequence of frames of a driver of the vehicle. The sequence of frames can be a video, a group of consecutively captured images, or other sequence of frames. The one or more image capture devices 202 (e.g., cameras or other image sensors) can be mounted, integrated, or otherwise part of the vehicle and can be directed or oriented toward the driver. As noted above, in some cases, activities of other people in the vehicle can be determined using the activity recognition system 200, in which case at least one of the one or more image capture devices 202 can be directed toward a seat in which a person can be seated in the vehicle. In some examples, the activity recognition system 200 can include multiple image capture devices (e.g., multiple cameras) that can capture frames.

Each of the one or more image capture devices 202 can include a camera or other type of image sensor. In some examples, the one or more image capture devices 202 can include an infrared (IR) camera configured to capture IR images and/or near-infrared (NIR) images. For example, an IR camera or sensor can capture IR signals. IR signals have wavelengths and frequencies that fall in the IR electromagnetic spectrum. The IR electromagnetic spectrum includes wavelengths in the range of 2,500 nanometers (nm) to 1 millimeter (mm), corresponding to frequencies ranging from 430 terahertz (THz) to 300 gigahertz (GHz). The infrared spectrum includes the NIR spectrum, which includes wavelengths in the range of 780 nm to 2,500 nm. In some cases, the activity recognition system 200 can include an IR sensor configured to capture IR and NIR signals. In some cases, separate IR and NIR sensors can be included in the activity recognition system 200. In some examples, the one or more image capture devices 202 can include a camera configured to capture color images and/or monochrome images. The color images can include: red-green-blue (RGB) images; luma, chroma-blue, chroma-red (YCbCr or Y'CbCr) images; and/or any other suitable type of image. In one illustrative example, the activity recognition system 200 can include an RGB camera or multiple RGB cameras. In some cases, the one or more image capture devices 202 can include one or more IR cameras and one or more RGB cameras.

The frames captured by the one or more image capture devices can be provided as input to the feature extraction machine learning model 204. In examples when multiple image capture devices are used to capture frames of the driver, the frames from the multiple image capture devices can be input and processed by the feature extraction machine learning model 204. The feature extraction machine learning model 204 can be trained to learn spatial information (e.g., features) associated with the frames. For instance, the feature extraction machine learning model 204 can be trained to learn features of the driver on a frame-by-frame basis (e.g., to extract features from each frame individually). Examples of training the feature extraction machine learning model 204 are provided below.

During inference (once the feature extraction machine learning model 204 has been trained), the feature extraction machine learning model 204 can receive one or more frames from the sequence of frames captured by the one or more image capture devices 202. In some cases, the sequence of frames (or a subset of the sequence of frames in some cases) can be input to the feature extraction machine learning model 204 as they are captured by the one or more image capture devices 202. The feature extraction machine learning model 204 can extract features associated with the driver of the vehicle from the input frames. As described below, the extracted features can be provided as input to the activity recognition machine learning model 208. The feature extraction machine learning model 204 can process each frame of the sequence of frames as each frame is captured and/or processed by the one or more image capture devices 202. Each frame of the sequence of frames can be consecutively processed (e.g., one frame at a time) by the feature extraction machine learning model 204 to extract the features from each frame. For instance, the feature extraction machine learning model 204 can extract the spatial features from each frame (e.g., based on processing that frame individually).

In some cases, the output of the feature extraction machine learning model 204 can include a feature vector (or other feature representation) representing the features extracted from each frame. In one illustrative example, a feature vector can have a dimension of 1×1×1280 (including 1280 values). In some cases, a single feature vector can be extracted from one input frame, with the feature vector containing all the information associated with features of the input frame. The features (e.g., represented as a feature vector) extracted from an input frame provide a representation of the frame, including information contained within the input frame. For example, the features can include data representing characteristics of the driver, including a pose of the driver's body, a pose of the driver's head, the location of the arm(s) and/or hand(s) of the driver, an amount by which the driver's mouth is open, among other characteristics. In some cases, the features can also include data representing characteristics of objects in the frame, such as a mobile device (e.g., a cellular telephone, a beverage, a cigarette, etc.).

Figure 3:
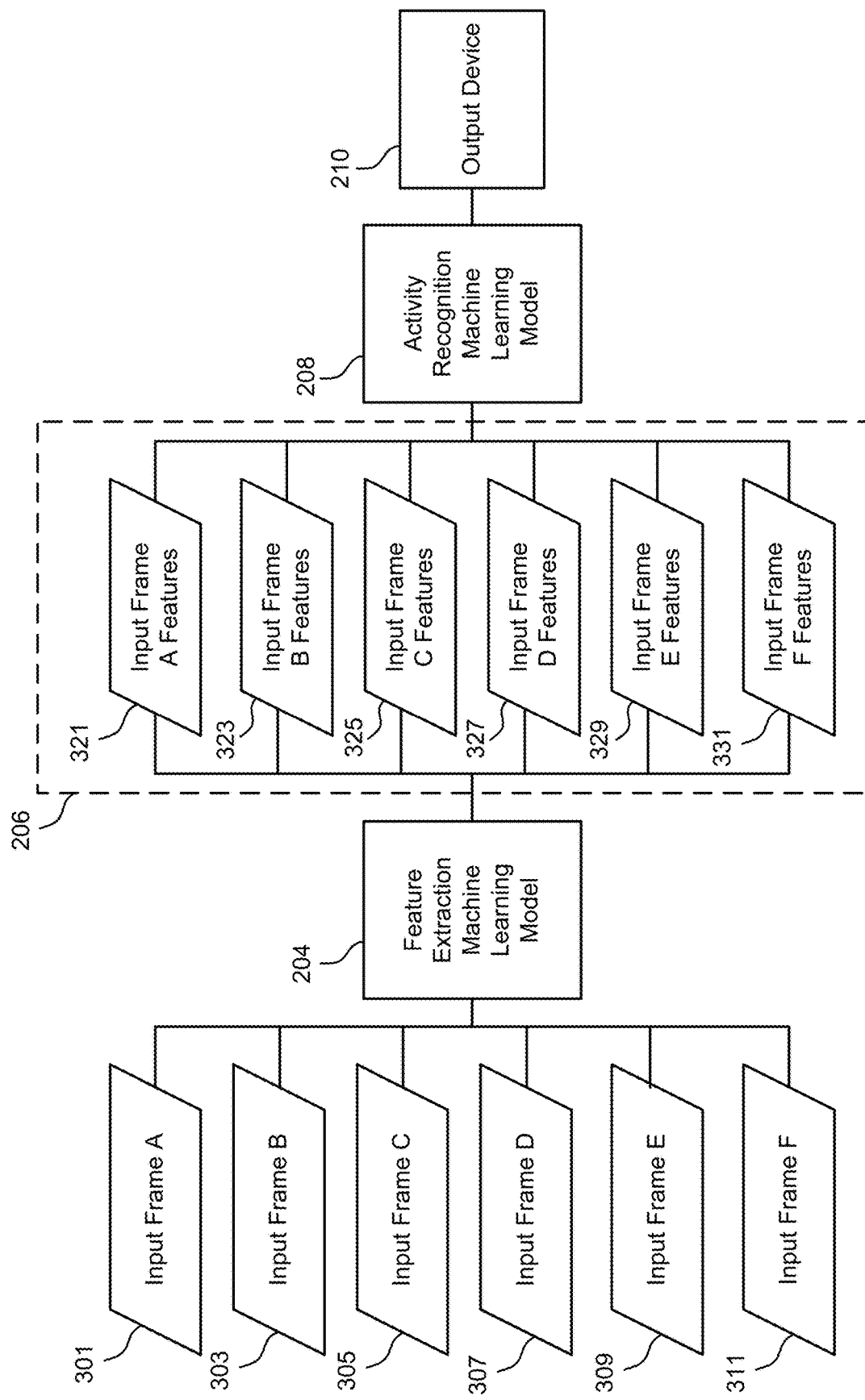
FIG. 3 is a block diagram illustrating an example of operation of the activity recognition system, in accordance with some examples.

FIG. 3 is a diagram illustrating an example of six input frames being input to the feature extraction machine learning model 204. The input frames include input frame A 301, input frame B 303, input frame C 305, input frame D 307, input frame E 309, and input frame F 311. The feature extraction machine learning model 204 can extract the features from each of the frames 301-311 as they are received (e.g., one frame at a time). For example, as shown in FIG. 3, the feature extraction machine learning model 204 can extract and output features 321 for input frame A 301, features 323 for input frame B 303, features 325 for input frame C 305, features 327 for input frame D 307, features 329 for input frame E 309, and features 331 for input frame F 311. The features 321-331 can each include a feature vector or can include multiple feature vectors representing the features extracted for each frame.

Returning to FIG. 2, the storage device 206 can be used to store the features extracted from the frames by the feature extraction machine learning model 204. The storage device 206 can include any type of storage. In one illustrative example, the storage device 206 can include a buffer. In some case, the buffer can be a first-in-first-out buffer. The storage device 206 can store the features for each frame as they are extracted by the feature extraction machine learning model 204. For example, the feature extraction machine learning model 204 can output the features extracted from each frame to the storage device 206.

In some cases, the storage device 206 can store features extracted from a threshold number of frames (e.g., features extracted from five frames, six frames, ten frames, or any other number of frames). In one illustrative example, the threshold number of frames can include six frames. Referring to FIG. 3 and using six frames as the threshold number of frames, the storage device 206 can store the features 321 for input frame A 301, the features 323 for input frame B 303, the features 325 for input frame C 305, the features 327 for input frame D 307, the features 329 for input frame E 309, and the features 331 for input frame F 311. By storing the features extracted from the threshold number of frames, each frame needs to be processed by the feature extraction machine learning model 204 only once, as explained in more detail herein.

Figure 4A:
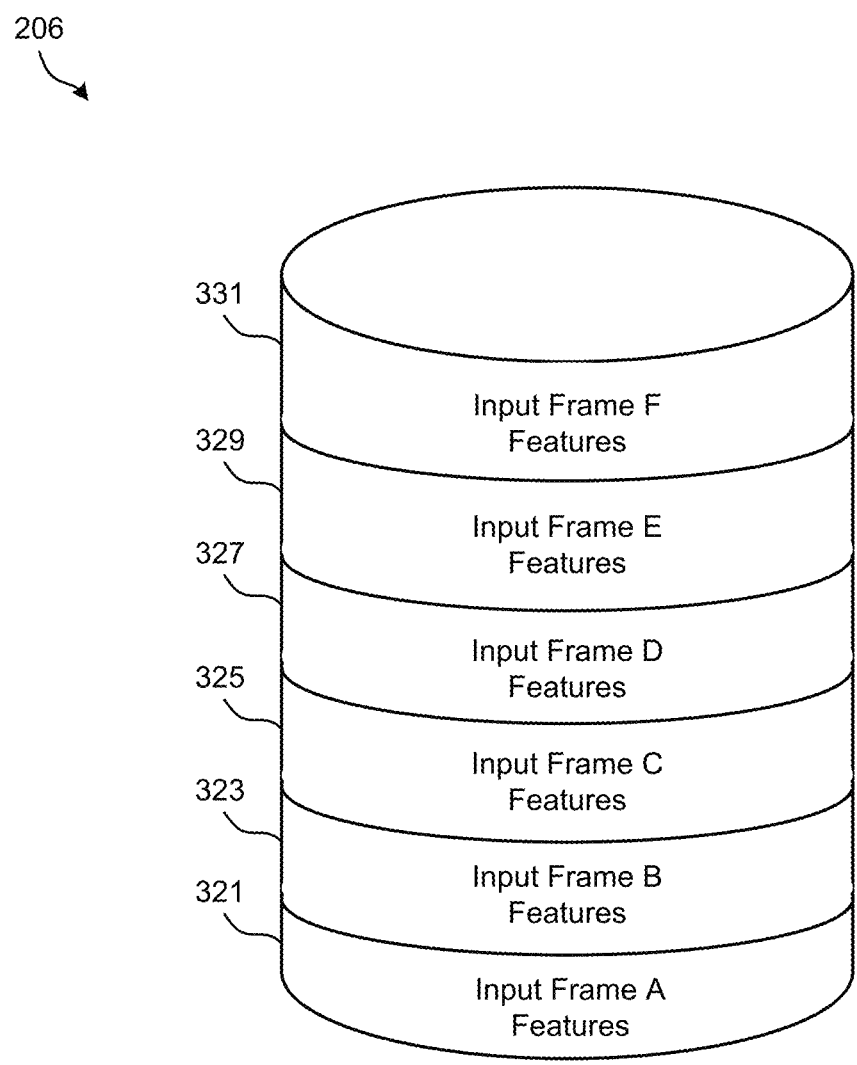
FIG. 4A and FIG. 4B are diagrams illustrating an example of operation of a storage device used for storing frame or image features, in accordance with some examples.
Figure 4B:
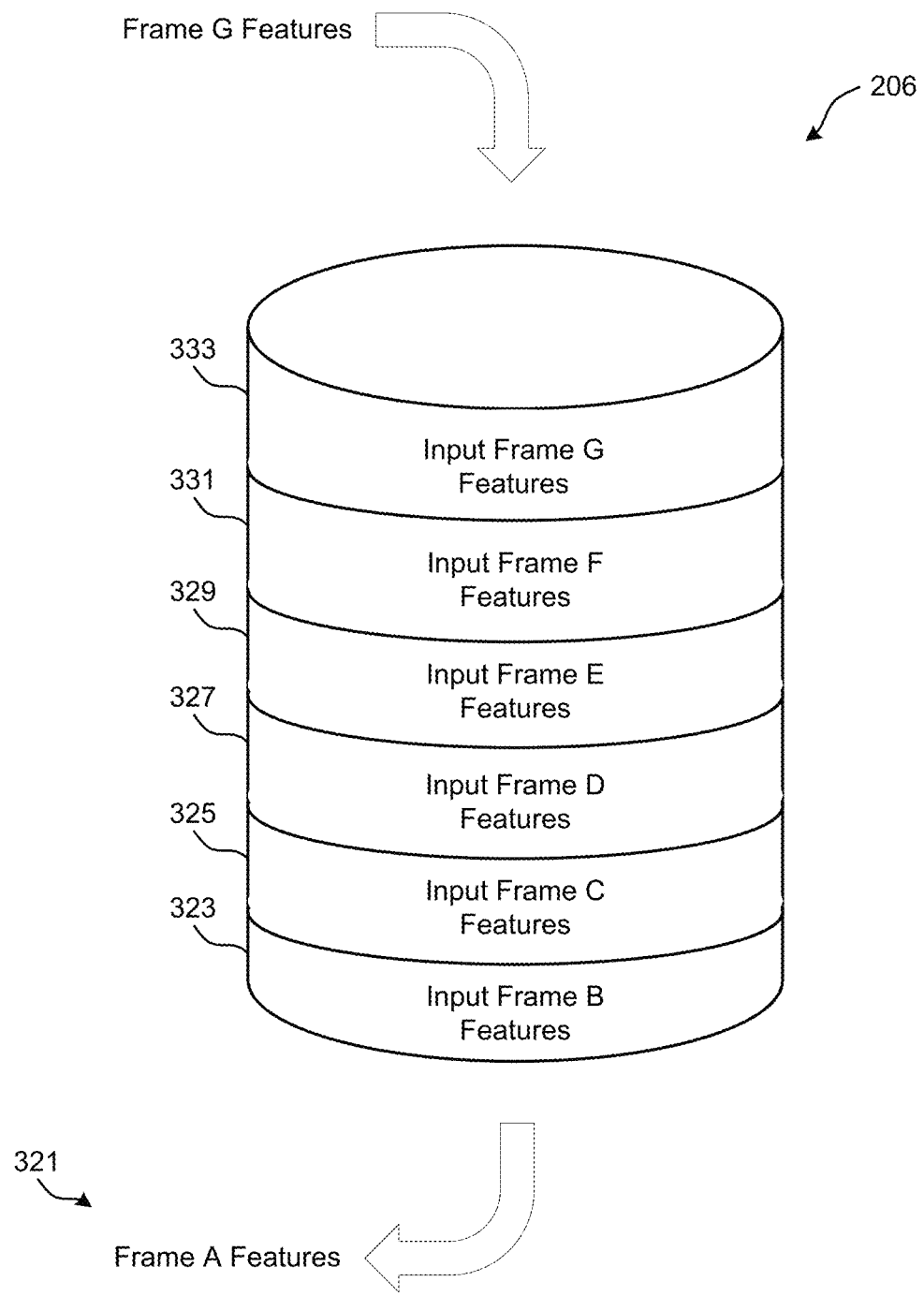

In some cases, the threshold number can correspond to a maximum number of features that can be stored by the storage device 206. For instance, the storage device 206 can store features for the threshold number of frames and can remove the oldest features from the storage device 206 as new features are stored in the storage device 206. FIG. 4A and FIG. 4B are diagrams illustrating an example of operation of the storage device 206. For example, using six frames as the threshold number of frames, the storage device 206 can initially store features for a first set of six frames. As shown in FIG. 4A, the features for the first set of six frames includes the features 321 for input frame A 301, the features 323 for input frame B 303, the features 325 for input frame C 305, the features 327 for input frame D 307, the features 329 for input frame E 309, and the features 331 for input frame F 311. Once a seventh input frame (a next frame in the sequence of frames, referred to as input frame G) is captured and output to the feature extraction machine learning model 204, the feature extraction machine learning model 204 can extract features 333 from the input frame G. The feature extraction machine learning model 204 can output the features 333 for the input frame G to the storage device 206. As shown in FIG. 4B, upon receiving the features 333 for the input frame G, the storage device 206 can remove the features 321 of frame A 301 (which is the oldest frame in the storage device 206). Once the features 321 of frame A 301 are removed, the storage device 206 can store the features 333 of frame G. The remaining features 323-333 can be provided as input to the activity recognition machine learning model 208.

The activity recognition machine learning model 208 can be trained to identify or classify a number of driving-related activities based on features extracted by the feature extraction machine learning model 204. During training, the activity recognition machine learning model 208 can learn temporal information across multiple frames through frame-to-frame relationships, which can allow the activity recognition machine learning model 208 to identify or classify one or more driving-related activities of a driver for a group of frames. In one illustrative example, the activity recognition machine learning model 208 can learn temporal information among three combinations of frames from the threshold number of frames, including two frames, three frames, and four frames as the interval feature. Other combinations of frames can be used in various implementations. Further details regarding training of the activity recognition machine learning model 208 are described below. In some cases, the combinations of frames can be used during inference of the activity recognition machine learning model 208.

During inference (after the activity recognition machine learning model 208 is trained), the activity recognition machine learning model 208 can identify or classify a driving-related activity being performed by the driver based on features extracted from input frames. In some examples, the features extracted from the threshold number of input frames (e.g., five input frames, six input frames, etc.) can be input to the activity recognition machine learning model 208. Using the threshold number of frames allows the activity recognition machine learning model 208 to learn the temporal information across the frames.

In some examples, the features extracted from multiple frames can be stacked or combined into one single or combined feature representation (e.g., a two-dimensional (2D) feature vector). The combined feature representation can be provided as input to the activity recognition machine learning model 208. In some cases, the activity recognition machine learning model 208 (or other component of the activity recognition system 200) can obtain the features from the storage device 206 and can combine the features to generate the combined feature representation. Referring to FIG. 3 and using six frames as an example of the threshold number of frames, the activity recognition machine learning model 208 (or other component of the activity recognition system 200) can generate a combined feature representation (e.g., a feature vector) for the six input frames 301-311 by combining the features 321-331 extracted by the feature extraction machine learning model 204 from each of the six frames 301-311. The features extracted from different input frames can be combined using one or more techniques. In one illustrative example, the features of the different frames can be combined by stacking the features of the frames through different dimension. For instance, given six 1280-dimension feature vectors (1×1280 feature vectors) extracted from six different input frames, the six feature vectors can be stacked into a 6×1280 array. In another illustrative example, the features of the different frames can be combined by concatenating the features. For instance, given six 1280-dimension feature vectors (1×1280 feature vectors) extracted from six different input frames, the feature vectors can be concatenated directly into a 1×7680 array. In another illustrative example, the features of the different frames can be combined by interleaving the features in any order and/or using padding to obtain combined representations having different dimensions. Other suitable techniques for combining the features can be used in some cases.

In some examples, as noted above, features for different combinations of the threshold number of frames can be processed by the activity recognition machine learning model 208, such as a features for combination of two frames, a combination of three frames, and a combination of four frames from the threshold number of frames. For instance, after the combined feature representation is input to the activity recognition machine learning model 208, the activity recognition machine learning model 208 can separate the features of the combined feature representation into a certain number of branches (e.g., a first branch for two of the frames, a second branch for three of the frames, and a third branch for four of the frames). The activity recognition machine learning model 208 can perform one or more operations (e.g., one or more convolutional operations) on the different combinations of frames (e.g., on each of the three branches). In such examples, the features output based on the one or more operations performed for the different combinations of frames can be combined (e.g., concatenated) and further processed to identify or classify a driving-related activity being performed by the driver. An example of using combinations of frames is provided below with respect to FIG. 8.

The output of the activity recognition machine learning model 208 can include an indication (e.g., a probability, likelihood, etc.) that an action being performed by the driver is a particular class of activity (e.g., performing normal driving activity, using a mobile device, drinking a beverage, yawning, looking up, etc.). For example, based on the temporal information determined or extracted by the activity recognition machine learning model 208 for the threshold number of frames, the output can include a probability or likelihood for each class of a number of classes of activity. In one illustrative example, the output can include an N-dimensional vector (e.g., N=10), where N can include the number of classes that the activity recognition machine learning model 208 has been trained to classify. Each number in the N-dimensional vector can represent the probability the activity being performed is of a certain class. In one illustrative example, if a 10-dimensional output vector represents ten different classes of activity is [0 0 0.05 0.8 0 0.15 0 0 0 0], the vector indicates that there is a 5% probability that the image is the third class of activity (e.g., the driver looking up), an 80% probability that the image is the fourth class of object (e.g., the driver yawning), and a 15% probability that the image is the sixth class of object (e.g., the driver is sleeping). The probability for a class can be considered a confidence level that the actual activity is part of a given class of activity.

The output device 210 can output an activity (or multiple activities in some cases) for processing by the activity recognition system 200 and/or another system of the vehicle (e.g., a driver monitoring system (DMS)). In one illustrative example, output device 210 can output the activity having the highest probability or confidence level from the classes the activity recognition machine learning model 208 is trained to classify. In some examples, one or more particular activities output by the output device 210 can trigger the DMS or other system of the vehicle to output a notification. For example, the one or more particular activities can be activities that introduce a risk of affecting the safety of the driver and/or other vehicles or pedestrians in proximity to the vehicle. The notification can alert the driver to be cautious and resume attention back to road conditions. The notification can include a visual notification, an audible notification, a haptic notification (e.g., vibration of a set, vibration of the steering wheel, etc.), any combination thereof, and/or other notifications. For example, a visual notification can be displayed using a display of the vehicle and/or a display of a device of the driver or other person in the vehicle. In another example, an audible notification can be output one or more speakers of the vehicle and/or one or more speakers of a device (e.g., a mobile phone, a tablet device, a wireless-enabled watch (or smart watch)) of the driver or other person in the vehicle.

The feature extraction machine learning model 204 and the activity recognition machine learning model 208 can be trained using any suitable machine learning training technique. In one illustrative example, supervised learning techniques can be used to train the feature extraction machine learning model 204 and the activity recognition machine learning model 208. For instance, the feature extraction machine learning model 204 and the activity recognition machine learning model 208 can include separate neural network models. A backpropagation training process can be performed to adjust the weights (and in some cases other parameters, such as biases) of the nodes of each of the neural networks. Backpropagation can include a forward pass, a loss function, a backward pass, and a weight update. The forward pass, loss function, backward pass, and parameter update is performed for one training iteration. The process can be repeated for the feature extraction machine learning model 204 for a certain number of iterations for each set of training data until the weights of the parameters of the feature extraction machine learning model 204 are accurately tuned. Similarly, the process can be repeated for the activity recognition machine learning model 208 for a certain number of iterations for each set of training data until the weights of the parameters of the activity recognition machine learning model 208 are accurately tuned.

In one illustrative example, the training data used to train the neural network of the feature extraction machine learning model 204 can include frames and labels (e.g., in a supervised training process) indicating the known features in the frames. The forward pass can include passing an input frame through the neural network. The weights may be initially randomized before the neural network is trained. For a first training iteration for the neural network system, the output may include values that do not give preference to any particular output, as the weights have not yet been calibrated. For example, the output can include a data representation (e.g., a vector, tensor, etc.) with values representing features for an input frame. After the first training iteration using the initial weights, the features will likely be dissimilar to the features provided in the label for that frame.

A loss function can be used to analyze error in the output. In the example, a Cross-Entropy loss can be used. Other loss functions can be used in some cases. One example of another loss function includes a mean squared error (MSE), defined as $E_{total}=\Sigma \frac{1}{2}(\text{target}-\text{output})^2$. The MSE calculates the sum of one-half times the actual answer minus the predicted (output) answer squared. The loss (or error) may be high for the first or initial training input frames, since the actual output values (features extracted by the network for those input frames) may be much different than the predicted output (the features provided by the label for those input frames). A goal of training is to minimize the amount of loss for the predicted output. The neural network can perform a backward pass by determining which inputs (weights) most contributed to the loss of the neural network and can adjust the weights so the loss decreases and is eventually minimized. A derivative of the loss with respect to the weights (denoted as dL/dW, where W are the weights at a particular layer) can be computed to determine the weights that most contributed to the loss of the neural network. For example, the weights can be updated so they change in the opposite direction of the gradient. The weight update can be denoted as $w=w_i-\eta dL/dW$, where w denotes a weight, $w_i$ denotes the initial weight, and $\eta$ denotes a learning rate. The learning rate can be set to any suitable value, with a high learning rate including larger weight updates and a lower value indicating smaller weight updates. The neural network of the feature extraction machine learning model 204 can continue to be trained in such a manner until a desired output is achieved.

In some cases, the neural network of the activity recognition machine learning model 208 can be trained in a similar manner as that described above for the neural network of the feature extraction machine learning model 204. The training data for the activity recognition machine learning model 208 can include input frames and labels indicating particular activities being performed in different groups of the input frames. For example, at each training iteration, features for the threshold number of input frames (e.g., the features 321-331 for the six input frames 301-311 shown in FIG. 3) can be input to the neural network along with a label indicating an activity being performed in the threshold number of input frames. The backpropagation training process described above can then be performed to train the parameters of the activity recognition machine learning model 208 until a desired output is achieved.

In some examples, as noted above, a three-stage training process can be used to train the feature extraction machine learning model 204 and the activity recognition machine learning model 208. As noted above, the feature extraction machine learning model 204 can extract spatial features from each input frame, and the activity recognition machine learning model 208 can determine temporal information among continuous input frames. The three-stage training process can be performed so that each of the models 204 and 208 can be individually trained to accurately perform their respective task before training the system end-to-end.

The three-stage training process can include first stage that includes training the feature extraction machine learning model 204 until a desired accuracy level is achieved. For example, the backpropagation training process described above can be performed to tune the weights and/or other parameters of the feature extraction machine learning model 204 until a first threshold accuracy is achieved. The accuracy can be determined by comparing the feature labels (or frame labels) of a first validation set of images to the output of the model 204. One illustrative example of the first threshold accuracy is 85%. Other values for the first threshold accuracy can be used.

A second stage of the three-stage training process can include training the activity recognition machine learning model 208 using the trained feature extraction machine learning model 204 with frozen weights. For example, once the first stage is complete, the feature extraction machine learning model 204 will have a certain set of tuned weights. The tuned weights of the feature extraction machine learning model 204 can be kept as-is when training the activity recognition machine learning model 208 during the second stage. During the second stage, the backpropagation training process described above can be performed to tune the weights and/or other parameters of the activity recognition machine learning model 208 until a second threshold accuracy is achieved. The accuracy can be determined by comparing the activity labels of a second validation set of images to the output of the activity recognition machine learning model 208. The first validation set and the second validation set of images can be the same set of images or can be different sets of images. One illustrative example of the second threshold accuracy is 88%. Other values for the second threshold accuracy can be used.

A third stage of the three-stage training process can include training the extraction machine learning model 204 and the activity recognition machine learning model 208 in an end-to-end manner. The third stage can be used to fine-tune the weights that were previously tuned during the first and second stages. In some cases, the backpropagation process described above can be performed for the entire system. For example, training images and labels can be input to the extraction machine learning model 204, which can output features to the activity recognition machine learning model 208. A loss can then be determined, and the weights and/or other parameters can be tuned. In some cases, the same images and labels used for the first and second stages can be used for the third stage. In some cases, different images and labels can be used for the first, second, and/or third stages.

Figure 5:
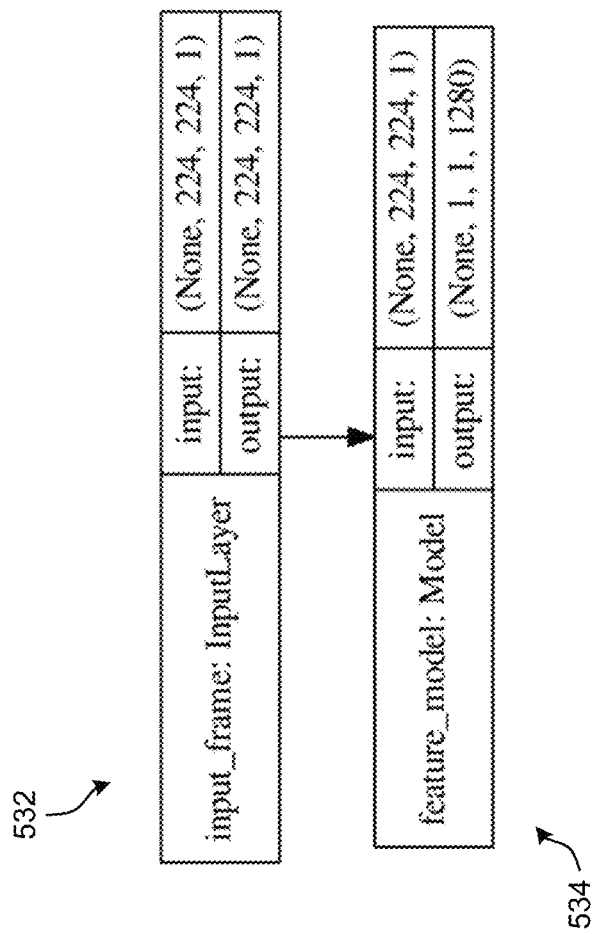
FIG. 5 is a diagram illustrating components of a feature extraction machine learning model, in accordance with some examples.
Figure 8:
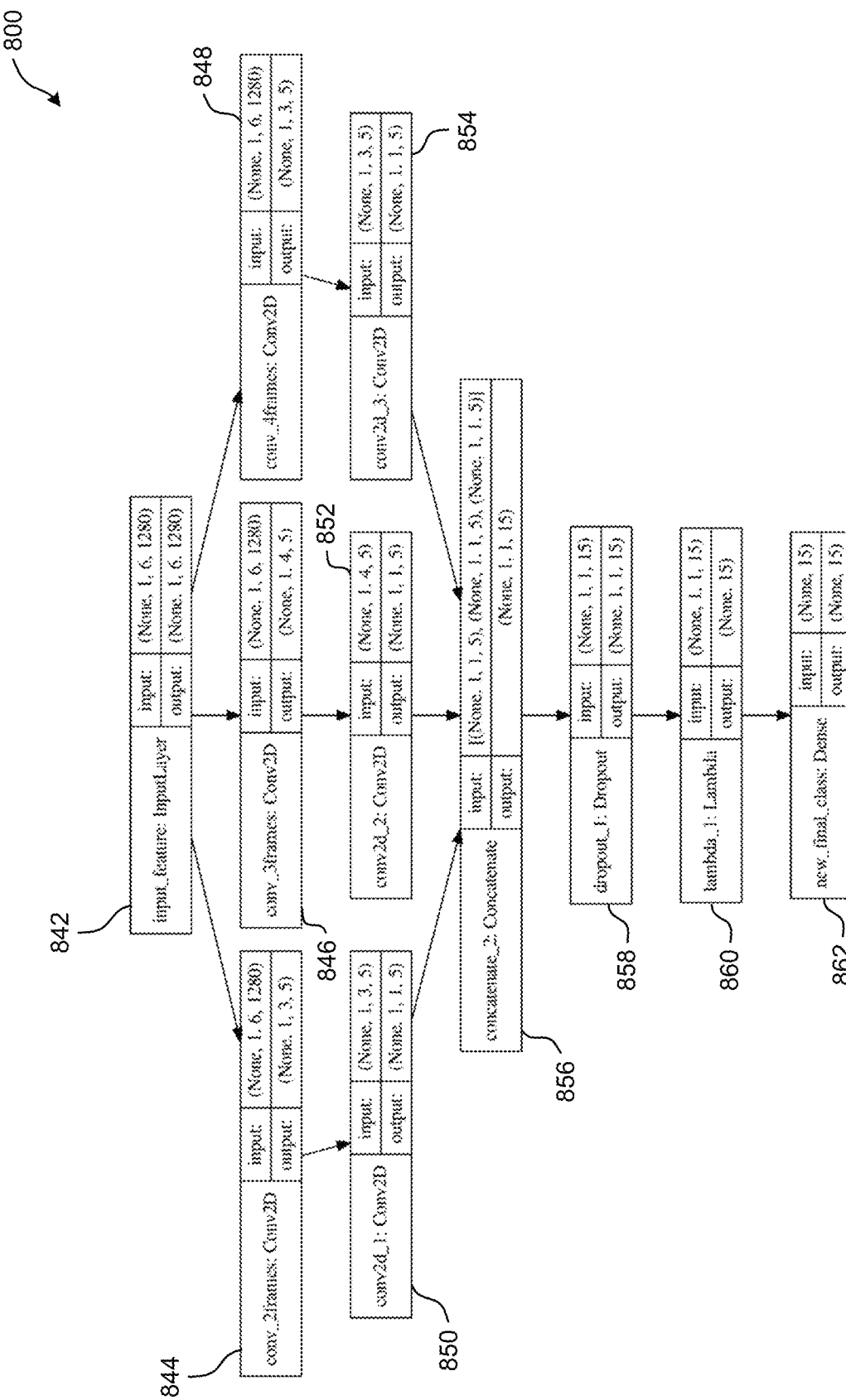
FIG. 8 is a diagram illustrating components of an activity recognition machine learning model, in accordance with some examples.

Illustrative examples of neural network components of the feature extraction machine learning model 204 and the activity recognition machine learning model 208 are shown in FIG. 5 and FIG. 8, respectively. For example, FIG. 5 illustrates is a diagram illustrating an example of an input layer 532 and an output layer 534 of the feature extraction machine learning model 204. As shown, the input layer 532 is an input frame having a dimension of 224×224×1, with a height of 224 pixels, a width of 224 pixels, and a single color component. The input frame can include an IR or NIR frame, a monochrome frame, or any other frame having a single color component. In some cases, the input frame can be a color frame, in which case the frame would have three color components (e.g., with a dimension of 224×224×3). In some examples, if an input frame is a color frame (e.g., including three color components or channels), the color input frame can be converted to a grayscale frame or a single color component or channel can be used (e.g., using the red channel as input). In some cases, input frames can have a larger dimension (e.g., an NIR frame having a resolution of 640×512 pixels). In such cases, each input frame having the larger dimension can be normalized to a resolution of 224×224, such as by downsampling or downscaling the images. The output layer 534 includes a feature vector generated based on the 224×224×1 input frame of the input layer 532. The feature vector has a dimension of 1×1×1280 (indicating the feature vector is a one-dimensional feature vector with a length of 1280 values). In some cases, a feature representation other than a feature vector can be used, such as a tensor or other representation.

In some examples, the neural network of the feature extraction machine learning model 204 includes a MobileNetV2 neural network architecture, as noted above. Table 1 illustrates an example of the neural network architecture, the input, and the parameters used for the MobileNetV2 neural network:

TABLE 1

| Input | Operator | t | c | n | s |
|---|---|---|---|---|---|
| $224^2 \times 1$ | conv2d | — | 32 | 1 | 2 |
| $112^2 \times 32$ | bottleneck | 1 | 16 | 1 | 1 |
| $112^2 \times 16$ | bottleneck | 6 | 24 | 2 | 2 |
| $56^2 \times 24$ | bottleneck | 6 | 32 | 3 | 2 |
| $28^2 \times 32$ | bottleneck | 6 | 64 | 4 | 2 |
| $14^2 \times 64$ | bottleneck | 6 | 96 | 3 | 1 |
| $14^2 \times 96$ | bottleneck | 6 | 160 | 3 | 2 |
| $7^2 \times 160$ | bottleneck | 6 | 320 | 1 | 1 |
| $7^2 \times 320$ | conv2d 1 × 1 | — | 1280 | 1 | 1 |
| $7^2 \times 1280$ | avgpool 7 × 7 | — | — | 1 | — |
| $1 \times 1 \times 1280$ | | — | 1 | — | |

The "bottleneck" operator refers to a bottleneck depth-separable convolution with residuals. The term t refers to an expansion factor, the term c refers to a number of output channels of a given layer, the term n refers to a number of times a given layer is repeated, and the term s refers to the stride or step amount (e.g., the amount by which a convolutional filter is iterated over an input). Further details regarding the MobileNetV2 network are described in Mark Sandler et al., "MobileNetV2: Inverted Residuals and Linear Bottlenecks," 2019.

The MobileNetV2 network is a quantization-friendly model, which can be beneficial when using certain processors that process data using integer-point data (as opposed to floating point representations). For example, some DSPs process only fixed-point or integer-point data. Using a fixed-point DSP can provide performance enhancements, such as enabling inference of the feature extraction machine learning model 204 and activity recognition machine learning model 208 neural networks to run much faster than if floating-point processors (e.g., CPUs and/or GPUs). Table 2 below shows the inference time using different processors:

TABLE 2

| Inference (milliseconds (ms)) | CPU (floating-point) | GPU (floating-point) | DSP (fixed-point) |
|---|---|---|---|
| Feature Model | 107.41 | 7.73 | 3.57 |
| Prediction model | 0.75 | 4.72 | 0.99 |
| Total | 108.16 | 12.45 | 4.56 |

Figures 6A, 6B:
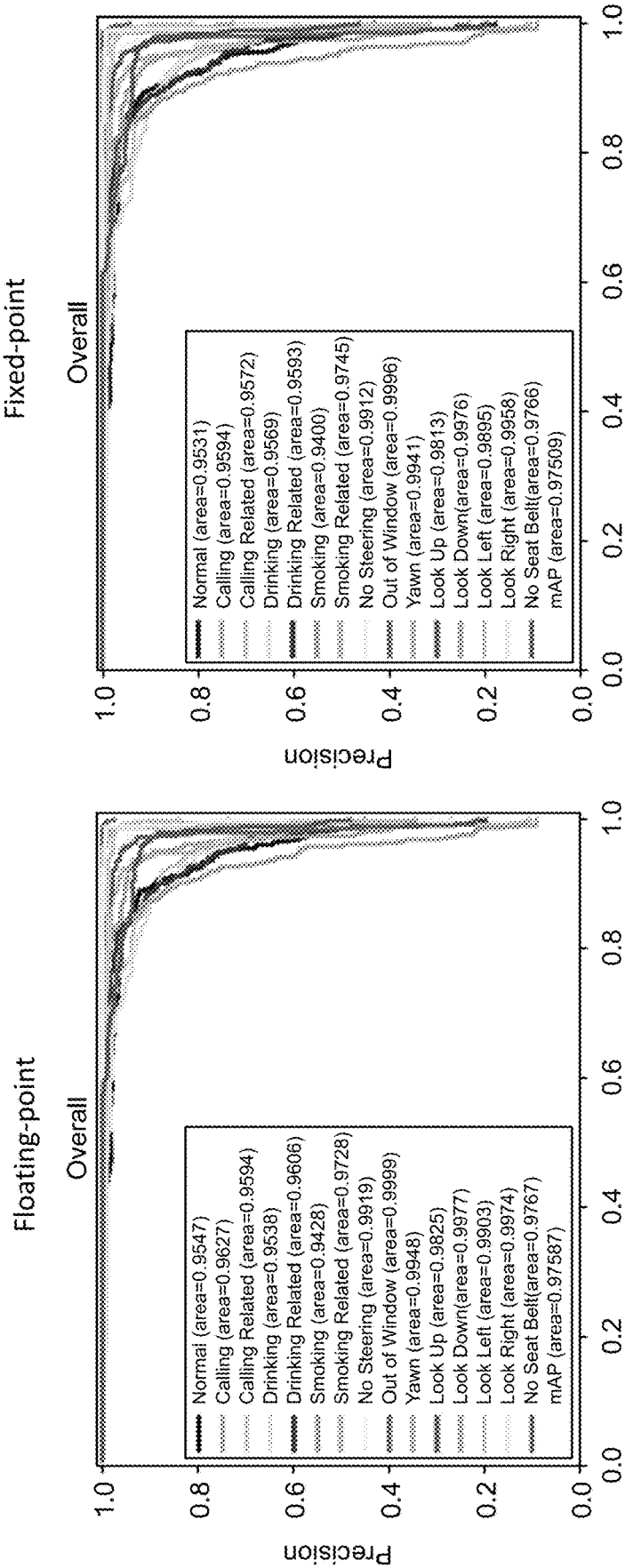
FIG. 6A is a graph illustrating an example of activity recognition results based on a floating point based machine learning model, in accordance with some examples.
FIG. 6B is a graph illustrating an example of activity recognition results based on a fixed point based machine learning model, in accordance with some examples.
Figures 7A, 7B:
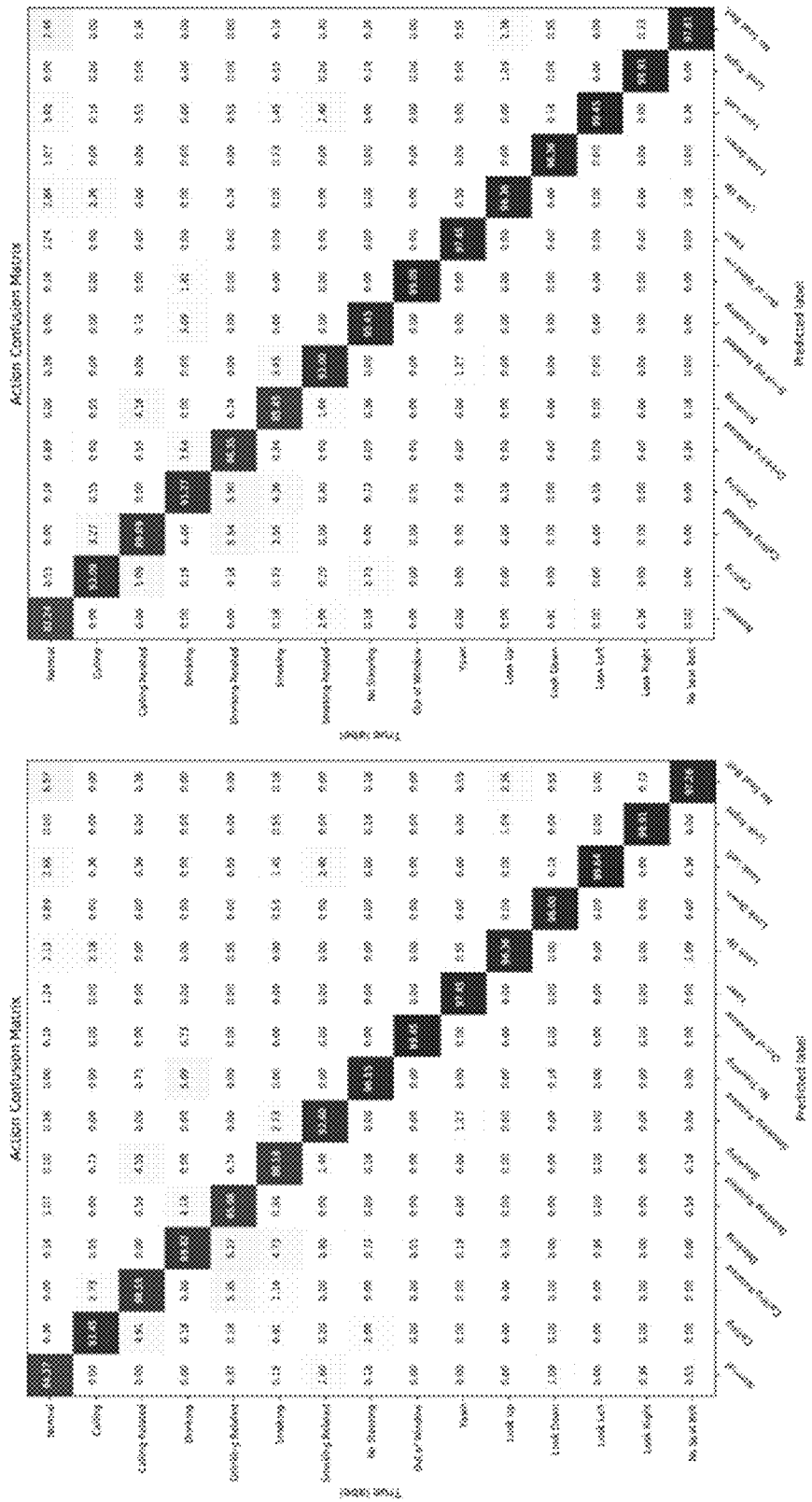
FIG. 7A is a diagram illustrating an example of a confusion matrix including values determined based on a floating point based machine learning model, in accordance with some examples.
FIG. 7B is a diagram illustrating an example of a confusion matrix including values determined based on a fixed point based machine learning model, in accordance with some examples.

In addition to providing faster inference times, use of a quantized (fixed-point) model shows similar performance as that of using a floating-point model. For example, FIG. 6A is a graph illustrating an example of activity recognition results based on using a floating point based machine learning model. FIG. 6B is a graph illustrating an example of activity recognition results based on using a fixed point based machine learning model. As shown, the performance associated with the results shown in FIG. 6B are similar to the performance associated with the results shown in FIG. 6A. FIG. 7A is a diagram illustrating an example of a confusion matrix including values determined based on using a floating point based machine learning model. FIG. 7B is a diagram illustrating an example of a confusion matrix including values determined based on using a fixed point based machine learning model. As illustrated, the performance associated with the results shown in FIG. 7B are similar to the performance associated with the results shown in FIG. 7A.

In some examples, the activity recognition machine learning model 208 is a convolutional neural network (CNN), such as a two-dimensional (2D) CNN or a three-dimensional (3D) CNN. The use of the combined feature representation (as described above) allows the activity recognition machine learning model 208 to learn temporal information across frames, without requiring more complicated neural network architectures such as recurrent-neural networks (RNNs) that have feedback mechanisms. A CNN (e.g., a 2D CNN) can result in faster processing speeds (as compared to RNNs and other neural network models) with fixed-length inputs.

FIG. 8 is a diagram illustrating an example of a 2D CNN 800 that can be used for the activity recognition machine learning model 208. As shown, an input layer 842 of the 2D CNN 800 includes a feature vector having a dimension of 1×6×1280. The feature vector is a combined feature vector based on a combination of six feature vectors each having a dimension of 1×1×1280. For example, the feature vector of the output layer 534 of FIG. 5 (having a dimension of 1×1×1280) can be combined with five other feature vectors (each having a dimension of 1×1×1280) extracted from five other frames. In some cases, a feature representation other than a feature vector can be used for the various features described herein, such as a tensor or other representation.

The input features are separated into a certain number of branches. For example, a first branch including layer 844 and layer 850 is used to measure the temporal information from two consecutive frames of the input frames. A second branch including layer 846 and layer 852 is used to measure the temporal information from three consecutive frames of the input frames. A third branch including layer 848 and layer 854 is used to measure the temporal information from four consecutive frames. Each of the layers 844, 846, 848, 850, 852, and 854 include convolutional layers that apply convolutional filters across the input features of the input layer 842. As shown, the features (of the input layer 842) from the six input frames are processed by the three branches. Each branch shares the same input vector (1×6×1280), and the various combinations of features are formed within each convolutional layer through kernel and stride design. For example, assuming the six feature vectors from the six input frame are 0, 1, 2, 3, 4, 5, the layer 844 (labeled "conv_2frames") will extract the following combinations of features: (0,1), (2,3), (4,5). The layer 846 (labeled "conv_3frames") will extract the following combinations of features: (0,1,2), (1,2,3), (2,3,4), (3,4,5). The layer 848 (labeled "conv_4frames") will extract combinations of features with the following order: (0,1,2,3), (1,2,3,4), (2,3,4,5). The outputs of the convolutional layers 850, 852, and 854 include feature vectors each having a dimension of 1×1×5. The feature vectors from the convolutional layers 850, 852, and 854 are concatenated or otherwise combined at layer 856 to generate an output feature vector having a dimension of 1×1×15.

A dropout layer 858 is used during training and may not be used during inference in order to avoid overfitting of the CNN 800 to the training data. In some cases, a lambda layer 860 can be included in the CNN 800. The lambda layer 860 can be used for reshaping in order to reshape the output feature vector from a dimension of 1×1×15 to 15. For example, the lambda layer 860 can perform reshaping to generate a correct input shape for the dense layer (or fully-connected layer) 862. In some cases, if the shape is not correct, the output of dense layer 862 may provide an unexpected or invalid result.

The final layer of the CNN 800 is a dense layer 862. In one illustrative example, the dense layer 862 can be a fully connected layer (e.g., with Softmax). Using the output feature vector from the lambda layer, the dense layer 862 can determine probabilities for a number of classes for which the CNN 800 is designed or trained to classify. For example, the output can include an 15-dimensional vector including a probability for each of 15 classes that the CNN 800 is being trained or has been trained to classify.

As noted above, the activity recognition system 200 and related techniques described herein can allow a system to detect various activity and perform functions based on the detected activity. For instance, using the activity recognition system 200, a DMS or other system of a vehicle can interact with human drivers and/or perform other functions based on detected activity of the human drivers. In one example, the DMS or other system of the vehicle can generate and output notifications based on an activity detected by the activity recognition system 200. Providing accurate notifications to a driver can reduce the chance that an accident will occur.

Further, by performing accurate activity detection or recognition in an efficient manner, the computing and power resources of a system (e.g., a vehicle or computing system of a vehicle) can be conserved for other operations. For example, the activity recognition system 200 includes a separate feature extraction machine learning model 204 and activity recognition machine learning model 208. Separating the activity recognition system 200 into the two separate models 204 and 208 allows the activity recognition system 200 to only need to process (e.g., run inference on) a given input frame once (as opposed to multiple times), which can reduce system overhead and bandwidth usage. For instance, the features extracted from a frame by the feature extraction machine learning model 204 can be stored in the storage device 206. The features can then be used multiple times by the activity recognition machine learning model when processing features for different combinations of frames.

In comparison, systems that include a single model for feature extraction and activity recognition model need to process a given input frame multiple times. For instance, the input to such a single model system include a number of frames and the output includes an activity prediction for the number of frames. In one example, six frames (including frame one to frame six) can be used as input for first iteration of such a single model system. The system can generate an activity recognition output for the frames one to six. A subsequent frame seven can be provided by an image capture device. For a next iteration of the single model system, the input to the system will be frame two to frame seven, in which case frame two to frame six will be processed a second time by the model. Using such a system, frame six will be processed six times by the model before it is discarded, resulting in wasted resources and bandwidth. By separating the activity recognition system 200 into the feature extraction machine learning model 204 and activity recognition machine learning model 208, each frame only needs to be processed once in order to extract the features of that frame for storage in the storage device 206. Once the features of a given frame are extracted and saved in the storage device 206, the frame can be discarded.

Figure 9:
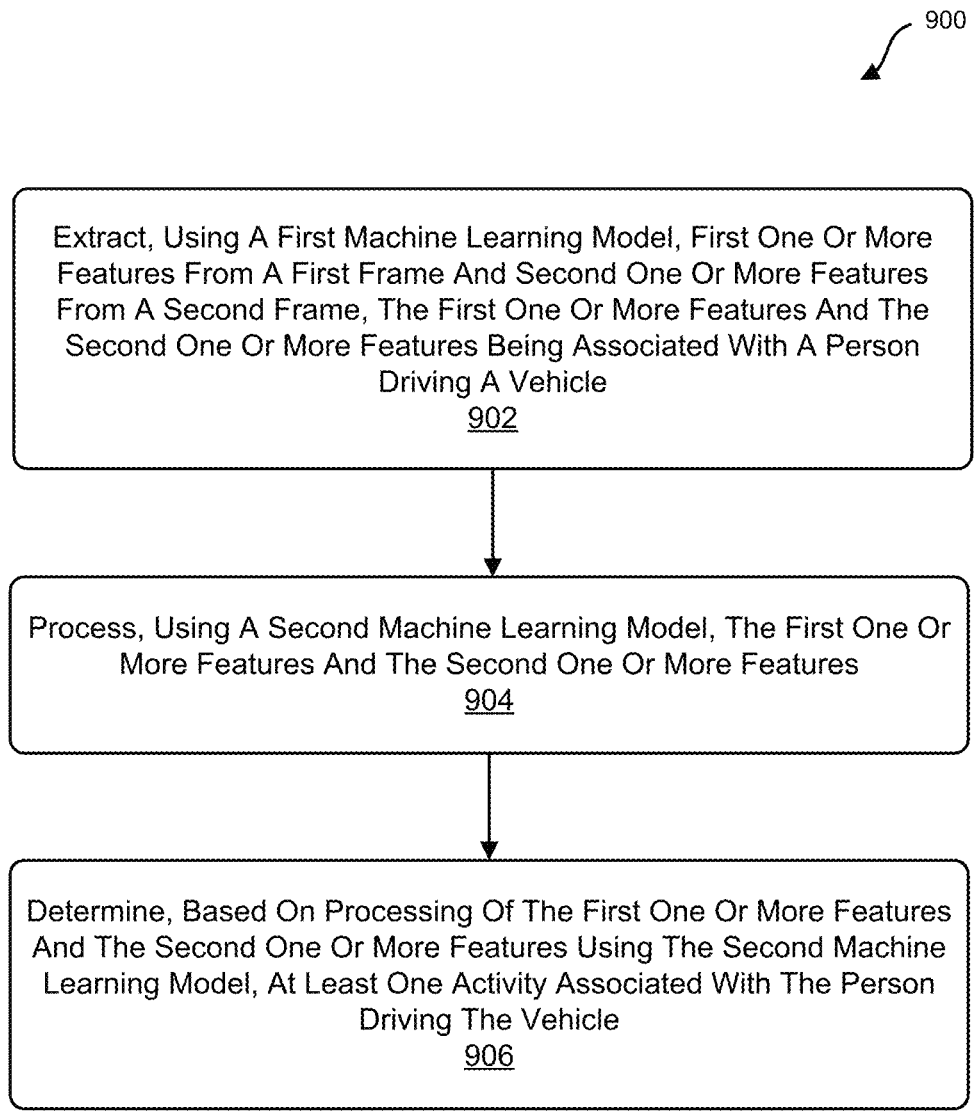
FIG. 9 is a flow diagram illustrating an example of a process for processing one or more frames, in accordance with some examples.

FIG. 9 is a flow diagram illustrating an example of a process 900 of processing one or more frames. At block 902, the process 900 includes extracting, using a first machine learning model, first one or more features from a first frame and second one or more features from a second frame. In one illustrative example, the first machine learning model includes the feature extraction machine learning model 204 shown in FIG. 2. In some examples, the first machine learning model includes a neural network (e.g., the Mobile-NetV2 neural network). The first one or more features and the second one or more features are associated with a person driving a vehicle. In some cases, the first frame occurs before the second frame in a sequence of frames. In some cases, the first one or more features are extracted at a first time and the second one or more features are extracted at a second time occurring after the first time.

At block 904, the process 900 includes processing, using a second machine learning model, the first one or more features and the second one or more features. In one illustrative example, the second machine learning model includes the activity recognition machine learning model 208 shown in FIG. 2. In some examples, the second machine learning model includes a convolutional neural network (CNN), as described above. For instance, in some examples, the CNN includes a two-dimensional CNN, a three-dimensional CNN, or other CNN.

At block 906, the process 900 includes determining, based on processing of the first one or more features and the second one or more features using the second machine learning model, at least one activity associated with the person driving the vehicle. For example, in some cases, the process 900 can include determining, using the second machine learning model, a classification associated with the first one or more features and the second one or more features. The classification is indicative of the at least one activity. For example, the process 900 can determine, based on processing of the first one or more features and the second one or more features using the second machine learning model, that the driver is performing a particular class of activity, such as performing normal driving activity, using a mobile device, drinking a beverage, yawning, looking up, among others.

In some examples, the process 900 includes generating a combined feature representation by combining the first one or more features and the second one or more features. In some cases, the at least one activity associated with the person driving the vehicle is determined based on processing of the combined feature representation using the second machine learning model. In some cases, the combined feature representation includes a feature vector. In some examples, the feature vector includes a two-dimensional feature vector. In some aspects, combining the first one or more features and the second one or more features includes concatenating the first one or more features and the second one or more features. Other techniques for combining the first one or more features and the second one or more features can be performed as described above, such as by stacking the features, interleaving the features, and/or using another suitable technique.

In some examples, the process 900 includes storing the first one or more features and the second one or more features in a storage device. In one illustrative example, the storage device includes the storage device 206 shown in FIG. 2. In some examples, the process 900 includes obtaining, from the storage device, the first one or more features and the second one or more features. The process 900 can include extracting, using the first machine learning model, third one or more features from a third frame. The third one or more features are associated with the person driving the vehicle. The process 900 can determine the at least one activity associated with the person driving the vehicle based on processing of the first one or more features, the second one or more features, and the third one or more features using the second machine learning model. In some cases, the process 900 can remove features from the storage device as other features are stored in the storage device, such as using techniques described with respect to FIG. 4A and FIG. 4B. For instance, the process 900 can include storing the third one or more features in the storage device, and removing features from the storage device based on storing the third one or more features in the storage device.

In some examples, the process 900 includes generating the combined feature representation by combining the first one or more features, the second one or more features, and the third one or more features. In some cases, the process 900 can determine the at least one activity associated with the person driving the vehicle based on processing of the combined feature representation using the second machine learning model.

In some examples, the process 900 includes outputting a notification based on the at least one activity. For example, the notification can include a visual notification, an audible notification, a combination of a visual and audible notification, and/or other notification. In such examples, outputting the notification can include displaying the visual notification, outputting the audible notification using at least one speaker of the vehicle, and/or outputting another type of notification.

In some examples, the processes described herein (e.g., process 900 and/or other process described herein) may be performed by a computing device or apparatus. In one example, one or more of the processes can be performed by the activity recognition system 200 of FIG. 2. In another example, one or more of the processes can be performed by the computing system 1200 shown in FIG. 12. For instance, a computing device with the computing system 1200 shown in FIG. 12 can include the components of the activity recognition system 200 and can implement the operations of the process 900 of FIG. 9 and/or other process described herein.

The computing device can include any suitable device, such as a vehicle or a computing device of a vehicle (e.g., a driver monitoring system (DMS) of a vehicle), a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, and/or any other computing device with the resource capabilities to perform the processes described herein, including the process 900 and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 900 illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
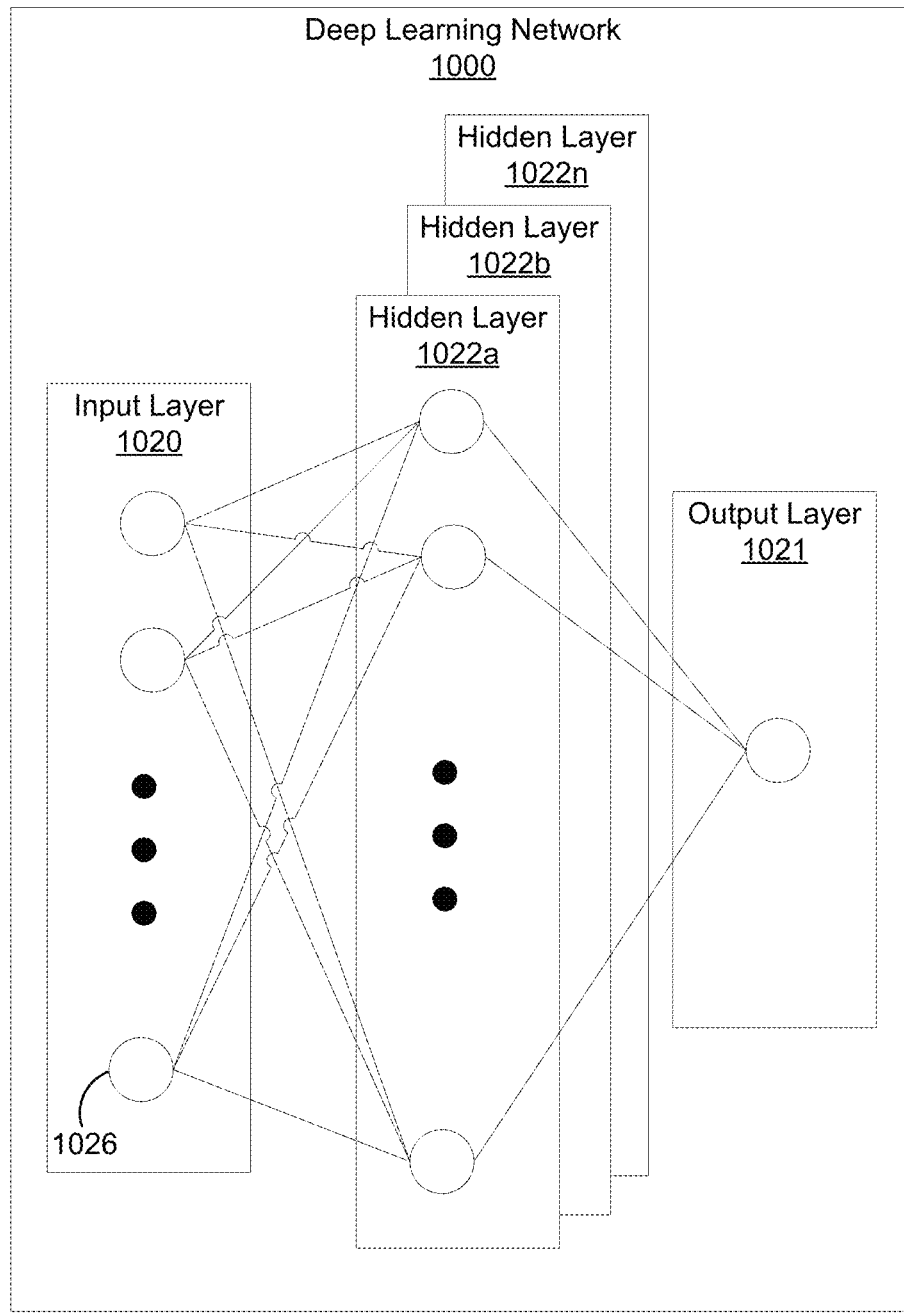
FIG. 10 is a block diagram illustrating an example of a deep learning network, in accordance with some examples.

As noted above, various aspects of the present disclosure can use machine learning models or systems. FIG. 10 is an illustrative example of a deep learning neural network 1000 that can be used to implement the machine learning based feature extraction and/or activity recognition (or classification) described above. An input layer 1020 includes input data. In one illustrative example, the input layer 1020 can include data representing the pixels of an input video frame. The neural network 1000 includes multiple hidden layers 1022a, 1022b, through 1022n. The hidden layers 1022a, 1022b, through 1022n include "n" number of hidden layers, where "n" is an integer greater than or equal to one. The number of hidden layers can be made to include as many layers as needed for the given application. The neural network 1000 further includes an output layer 1021 that provides an output resulting from the processing performed by the hidden layers 1022a, 1022b, through 1022n. In one illustrative example, the output layer 1021 can provide a classification for an object in an input video frame. The classification can include a class identifying the type of activity (e.g., looking up, looking down, closing eyes, yawning, etc.).

The neural network 1000 is a multi-layer neural network of interconnected nodes. Each node can represent a piece of information. Information associated with the nodes is shared among the different layers and each layer retains information as information is processed. In some cases, the neural network 1000 can include a feed-forward network, in which case there are no feedback connections where outputs of the network are fed back into itself. In some cases, the neural network 1000 can include a recurrent neural network, which can have loops that allow information to be carried across nodes while reading in input.

Information can be exchanged between nodes through node-to-node interconnections between the various layers. Nodes of the input layer 1020 can activate a set of nodes in the first hidden layer 1022a. For example, as shown, each of the input nodes of the input layer 1020 is connected to each of the nodes of the first hidden layer 1022a. The nodes of the first hidden layer 1022a can transform the information of each input node by applying activation functions to the input node information. The information derived from the transformation can then be passed to and can activate the nodes of the next hidden layer 1022b, which can perform their own designated functions. Example functions include convolutional, up-sampling, data transformation, and/or any other suitable functions. The output of the hidden layer 1022b can then activate nodes of the next hidden layer, and so on. The output of the last hidden layer 1022n can activate one or more nodes of the output layer 1021, at which an output is provided. In some cases, while nodes (e.g., node 1026) in the neural network 1000 are shown as having multiple output lines, a node has a single output and all lines shown as being output from a node represent the same output value.

In some cases, each node or interconnection between nodes can have a weight that is a set of parameters derived from the training of the neural network 1000. Once the neural network 1000 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 1000 to be adaptive to inputs and able to learn as more and more data is processed.

The neural network 1000 is pre-trained to process the features from the data in the input layer 1020 using the different hidden layers 1022a, 1022b, through 1022n in order to provide the output through the output layer 1021. In an example in which the neural network 1000 is used to identify activities being performed by a driver in frames, the neural network 1000 can be trained using training data that includes both frames and labels, as described above. For instance, training frames can be input into the network, with each training frame having a label indicating the features in the frames (for the feature extraction machine learning system) or a label indicating classes of an activity in each frame. In one example using object classification for illustrative purposes, a training frame can include an image of a number 2, in which case the label for the image can be [0 0 1 0 0 0 0 0 0 0].

In some cases, the neural network 1000 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 1000 is trained well enough so that the weights of the layers are accurately tuned.

For the example of identifying objects in frames, the forward pass can include passing a training frame through the neural network 1000. The weights are initially randomized before the neural network 1000 is trained. As an illustrative example, a frame can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for the neural network 1000, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 1000 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $$E_{total} = \sum \frac{1}{2}(\text{target} - \text{output})^2.$$

The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 1000 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w = w_i - \eta dL/dW$, where W denotes a weight, $w_i$ denotes the initial weight, and $\eta$ denotes a learning rate. The learning rate can be set to any suitable value, with a high learning rate including larger weight updates and a lower value indicating smaller weight updates.

The neural network 1000 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 1000 can include any other deep network other than a CNN, such as an autoencoder, a deep belief nets (DBNs), a Recurrent Neural Networks (RNNs), among others.

Figure 11:
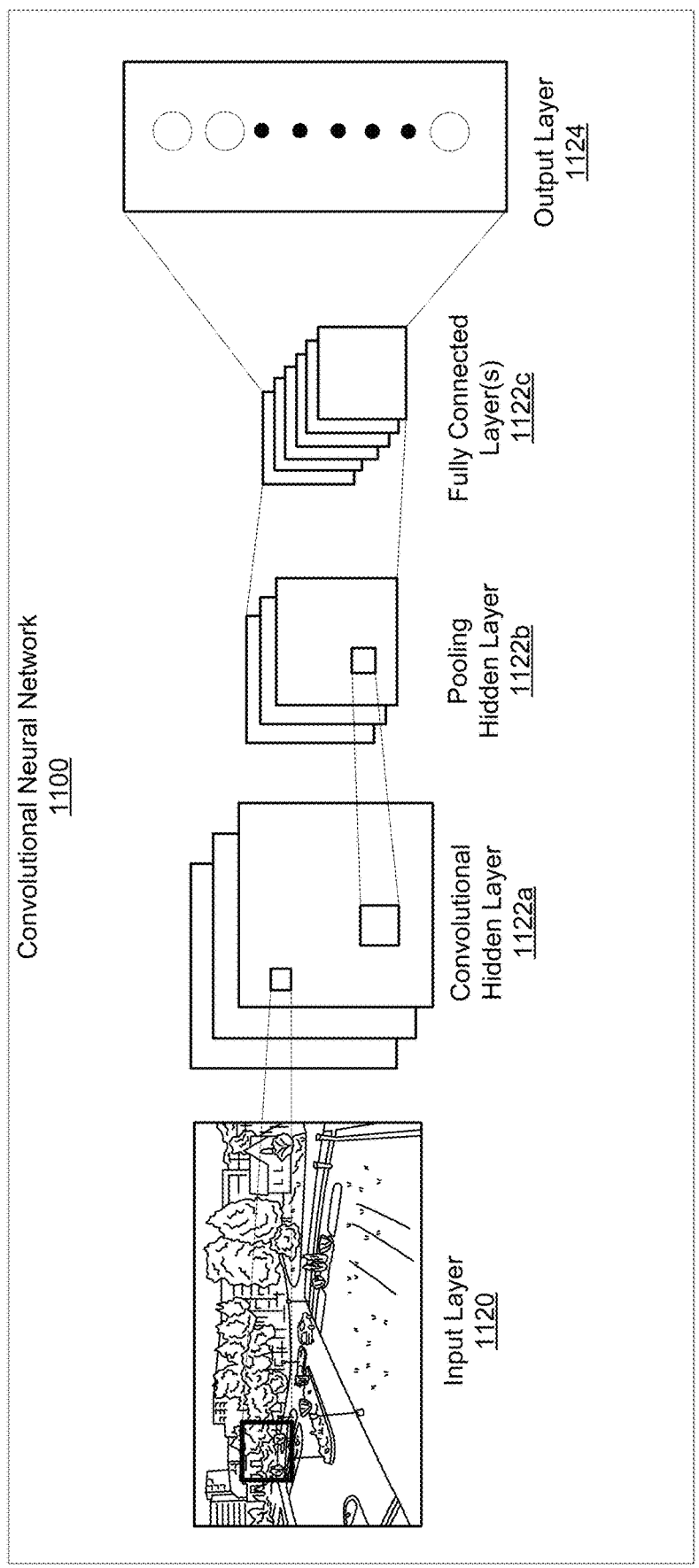
FIG. 11 is a block diagram illustrating an example of a convolutional neural network, in accordance with some examples.

FIG. 11 is an illustrative example of a convolutional neural network (CNN) 1100. The input layer 1120 of the CNN 1100 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1122a, an optional non-linear activation layer, a pooling hidden layer 1122b, and fully connected hidden layers 1122c to get an output at the output layer 1124. While only one of each hidden layer is shown in FIG. 11, one of ordinary skill will appreciate that multiple convolutional hidden layers, non-linear layers, pooling hidden layers, and/or fully connected layers can be included in the CNN 1100. As previously described, the output can indicate a single class of an object or can include a probability of classes that best describe the object in the image.

The first layer of the CNN 1100 is the convolutional hidden layer 1122a. The convolutional hidden layer 1122a analyzes the image data of the input layer 1120. Each node of the convolutional hidden layer 1122a is connected to a region of nodes (pixels) of the input image called a receptive field. The convolutional hidden layer 1122a can be considered as one or more filters (each filter corresponding to a different activation or feature map), with each convolutional iteration of a filter being a node or neuron of the convolutional hidden layer 1122a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1122a. Each connection between a node and a receptive field for that node learns a weight and, in some cases, an overall bias such that each node learns to analyze its particular local receptive field in the input image. Each node of the hidden layer 1122a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1122a is due to each node of the convolutional layer being applied to its corresponding receptive field. For example, a filter of the convolutional hidden layer 1122a can begin in the top-left corner of the input image array and can convolve around the input image. As noted above, each convolutional iteration of the filter can be considered a node or neuron of the convolutional hidden layer 1122a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1122a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1122a.

The mapping from the input layer to the convolutional hidden layer 1122a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image.

The convolutional hidden layer 1122a can include several activation maps in order to identify multiple features in an image. The example shown in FIG. 11 includes three activation maps. Using three activation maps, the convolutional hidden layer 1122a can detect three different kinds of features, with each feature being detectable across the entire image.

In some examples, a non-linear hidden layer can be applied after the convolutional hidden layer 1122a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 1100 without affecting the receptive fields of the convolutional hidden layer 1122a.

The pooling hidden layer 1122b can be applied after the convolutional hidden layer 1122a (and after the non-linear hidden layer when used). The pooling hidden layer 1122b is used to simplify the information in the output from the convolutional hidden layer 1122a. For example, the pooling hidden layer 1122b can take each activation map output from the convolutional hidden layer 1122a and generates a condensed activation map (or feature map) using a pooling function. Max-pooling is one example of a function performed by a pooling hidden layer. Other forms of pooling functions be used by the pooling hidden layer 1122a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1122a. In the example shown in FIG. 11, three pooling filters are used for the three activation maps in the convolutional hidden layer 1122a.

In some examples, max-pooling can be used by applying a max-pooling filter (e.g., having a size of 2×2) with a stride (e.g., equal to a dimension of the filter, such as a stride of 2) to an activation map output from the convolutional hidden layer 1122a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1122a having a dimension of 24×24 nodes, the output from the pooling hidden layer 1122b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1100.

The final layer of connections in the network is a fully-connected layer that connects every node from the pooling hidden layer 1122b to every one of the output nodes in the output layer 1124. Using the example above, the input layer includes 28×28 nodes encoding the pixel intensities of the input image, the convolutional hidden layer 1122a includes 3×24×24 hidden feature nodes based on application of a 5×5 local receptive field (for the filters) to three activation maps, and the pooling hidden layer 1122b includes a layer of 3×12×12 hidden feature nodes based on application of max-pooling filter to 2×2 regions across each of the three feature maps. Extending this example, the output layer 1124 can include ten output nodes. In such an example, every node of the 3×12×12 pooling hidden layer 1122b is connected to every node of the output layer 1124.

The fully connected layer 1122c can obtain the output of the previous pooling hidden layer 1122b (which should represent the activation maps of high-level features) and determines the features that most correlate to a particular class. For example, the fully connected layer 1122c layer can determine the high-level features that most strongly correlate to a particular class, and can include weights (nodes) for the high-level features. A product can be computed between the weights of the fully connected layer 1122c and the pooling hidden layer 1122b to obtain probabilities for the different classes. For example, if the CNN 1100 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1124 can include an M-dimensional vector (in the prior example, M=10). M indicates the number of classes that the CNN 1100 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 12:
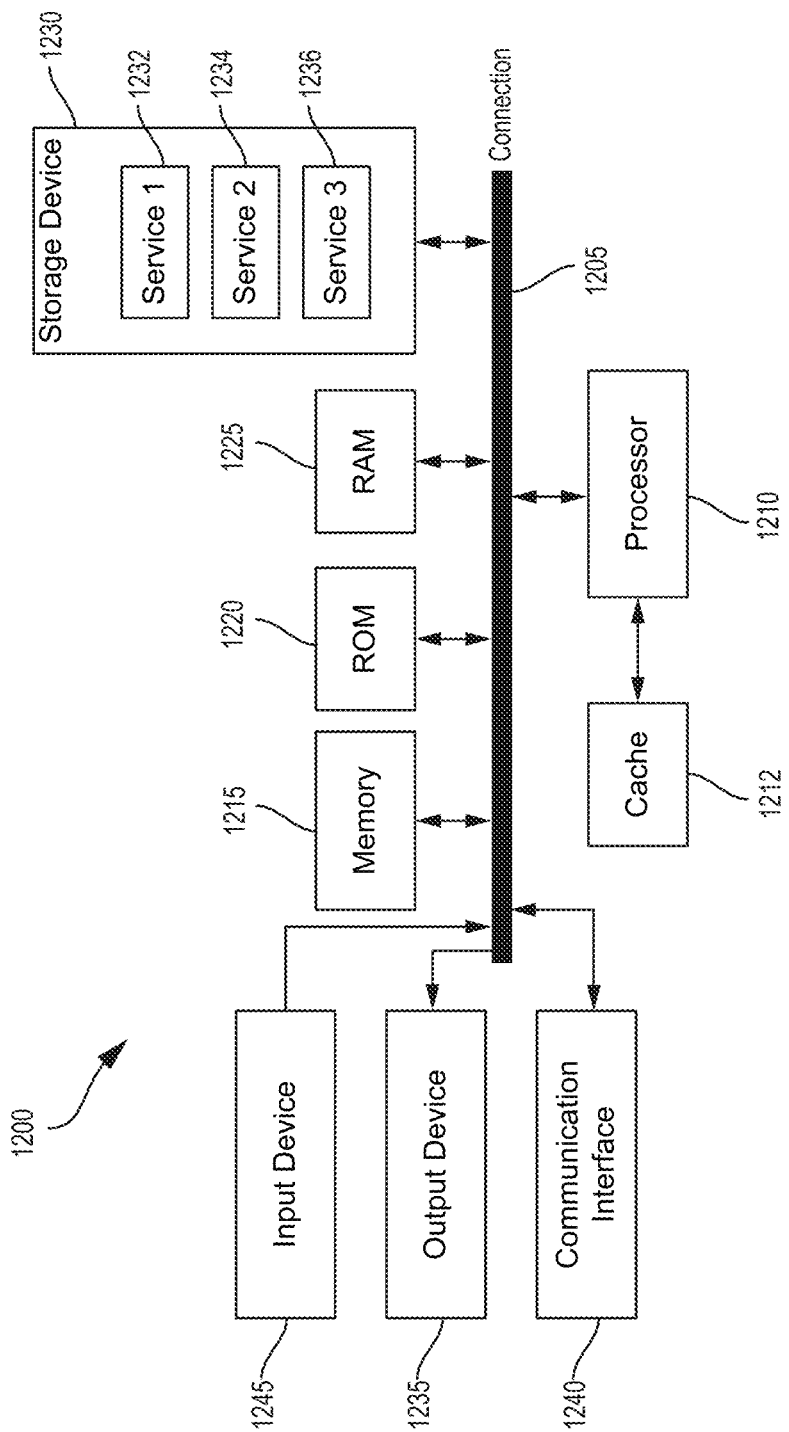
FIG. 12 is a diagram illustrating an example of a computing system for implementing certain aspects described herein.

FIG. 12 is a diagram illustrating an example of a system for implementing certain aspects of the present technology. In particular, FIG. 12 illustrates an example of computing system 1200, which can be for example any computing device making up internal computing system, a remote computing system, a camera, or any component thereof in which the components of the system are in communication with each other using connection 1205. Connection 1205 can be a physical connection using a bus, or a direct connection into processor 1210, such as in a chipset architecture. Connection 1205 can also be a virtual connection, networked connection, or logical connection.

In some embodiments, computing system 1200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1200 includes at least one processing unit (CPU or processor) 1210 and connection 1205 that couples various system components including system memory 1215, such as read-only memory (ROM) 1220 and random access memory (RAM) 1225 to processor 1210. Computing system 1200 can include a cache 1212 of high-speed memory connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms. In some instances, multimodal systems can enable a user to provide multiple types of input/output to communicate with computing system 1200. Computing system 1200 can include communications interface 1240, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1230 can include software services, servers, services, etc., that when the code that defines such software is executed by the processor 1210, it causes the system to perform a function. In some embodiments, a hardware service that performs a particular function can include the software component stored in a computer-readable medium in connection with the necessary hardware components, such as processor 1210, connection 1205, output device 1235, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method of processing one or more frames, the method comprising: extracting, using a first machine learning model, first one or more features from a first frame and second one or more features from a second frame, the first one or more features and the second one or more features being associated with a person driving a vehicle; processing, using a second machine learning model, the first one or more features and the second one or more features; and determining, based on processing of the first one or more features and the second one or more features using the second machine learning model, at least one activity associated with the person driving the vehicle.

Aspect 2: The method of aspect 1, wherein the first frame occurs before the second frame in a sequence of frames.

Aspect 3: The method of any one of aspects 1 or 2, wherein the first one or more features are extracted at a first time and the second one or more features are extracted at a second time occurring after the first time.

Aspect 4: The method of any one of aspects 1 to 3, further comprising: generating a combined feature representation at least in part by combining the first one or more features and the second one or more features; wherein the at least one activity associated with the person driving the vehicle is determined based on processing of the combined feature representation using the second machine learning model.

Aspect 5: The method of aspect 4, wherein the combined feature representation includes a feature vector.

Aspect 6: The method of aspect 5, wherein the feature vector includes a two-dimensional feature vector.

Aspect 7: The method of any one of aspects 4 to 6, wherein combining the first one or more features and the second one or more features includes concatenating the first one or more features and the second one or more features.

Aspect 8: The method of any one of aspects 1 to 7, further comprising: storing the first one or more features and the second one or more features in a storage device.

Aspect 9: The method of aspect 8, further comprising: obtaining, from the storage device, the first one or more features and the second one or more features; and extracting, using the first machine learning model, third one or more features from a third frame, the third one or more features being associated with the person driving the vehicle; and wherein the at least one activity associated with the person driving the vehicle is determined based on processing of the first one or more features, the second one or more features, and the third one or more features using the second machine learning model.

Aspect 10: The method of aspect 9, further comprising: storing the third one or more features in the storage device; and removing features from the storage device based on storing the third one or more features in the storage device.

Aspect 11: The method of any one of aspects 9 or 10, further comprising: generating a combined feature representation at least in part by combining the first one or more features, the second one or more features, and the third one or more features; wherein the at least one activity associated with the person driving the vehicle is determined based on processing of the combined feature representation using the second machine learning model.

Aspect 12: The method of any one of aspects 1 to 11, wherein processing of the first one or more features and the second one or more features using the second machine learning model includes: determining, using the second machine learning model, a classification associated with the first one or more features and the second one or more features, the classification being indicative of the at least one activity.

Aspect 13: The method of any one of aspects 1 to 12, wherein the first machine learning model includes a neural network.

Aspect 14: The method of any one of aspects 1 to 13, wherein the second machine learning model includes a convolutional neural network.

Aspect 15: The method of aspect 14, wherein the convolutional neural network includes a two-dimensional convolutional neural network.

Aspect 16: The method of any one of aspects 1 to 15, further comprising: outputting a notification based on the at least one activity.

Aspect 17: The method of aspect 16, wherein the notification includes a visual notification, and wherein outputting the notification includes displaying the visual notification.

Aspect 18: The method of any one of aspects 16 or 17, wherein the notification includes an audible notification, and wherein outputting the notification includes outputting the audible notification using at least one speaker of the vehicle.

Aspect 19: An apparatus for processing one or more frames, comprising: a memory; and a processor coupled to the memory, the processor configured to: extract, using a first machine learning model, first one or more features from a first frame and second one or more features from a second frame, the first one or more features and the second one or more features being associated with a person driving a vehicle; process, using a second machine learning model, the first one or more features and the second one or more features; and determine, based on processing of the first one or more features and the second one or more features using the second machine learning model, at least one activity associated with the person driving the vehicle.

Aspect 20: The apparatus of aspect 19, wherein the first frame occurs before the second frame in a sequence of frames.

Aspect 21: The apparatus of any one of aspects 19 or 20, wherein the first one or more features are extracted at a first time and the second one or more features are extracted at a second time occurring after the first time.

Aspect 22: The apparatus of any one of aspects 19 to 21, wherein the processor is configured to: generate a combined feature representation at least in part by combining the first one or more features and the second one or more features; wherein the at least one activity associated with the person driving the vehicle is determined based on processing of the combined feature representation using the second machine learning model.

Aspect 23: The apparatus of aspect 22, wherein the combined feature representation includes a feature vector.

Aspect 24: The apparatus of aspect 23, wherein the feature vector includes a two-dimensional feature vector.

Aspect 25: The apparatus of any one of aspects 23 to 24, wherein the processor is configured to combine the first one or more features and the second one or more features at least in part by concatenating the first one or more features and the second one or more features.

Aspect 26: The apparatus of any one of aspects 19 to 25, wherein the processor is configured to: store the first one or more features and the second one or more features in a storage device.

Aspect 27: The apparatus of aspect 26, wherein the processor is configured to: obtain, from the storage device, the first one or more features and the second one or more features; and extract, using the first machine learning model, third one or more features from a third frame, the third one or more features being associated with the person driving the vehicle; and wherein the at least one activity associated with the person driving the vehicle is determined based on processing of the first one or more features, the second one or more features, and the third one or more features using the second machine learning model.

Aspect 28: The apparatus of aspect 27, wherein the processor is configured to: store the third one or more features in the storage device; and remove features from the storage device based on storing the third one or more features in the storage device.

Aspect 29: The apparatus of any one of aspects 27 or 28, wherein the processor is configured to: generate a combined feature representation at least in part by combining the first one or more features, the second one or more features, and the third one or more features; wherein the at least one activity associated with the person driving the vehicle is determined based on processing of the combined feature representation using the second machine learning model.

Aspect 30: The apparatus of any one of aspects 19 to 29, wherein the processor is configured to: determine, using the second machine learning model, a classification associated with the first one or more features and the second one or more features, the classification being indicative of the at least one activity.

Aspect 31: The apparatus of any one of aspects 19 to 30, wherein the first machine learning model includes a neural network.

Aspect 32: The apparatus of any one of aspects 19 to 31, wherein the second machine learning model includes a convolutional neural network.

Aspect 33: The apparatus of aspect 32, wherein the convolutional neural network includes a two-dimensional convolutional neural network.

Aspect 34: The apparatus of any one of aspects 19 to 33, wherein the processor is configured to: output a notification based on the at least one activity.

Aspect 35: The apparatus of aspect 34, wherein the notification includes a visual notification, and wherein outputting the notification includes displaying the visual notification.

Aspect 36: The apparatus of any one of aspects 34 or 35, wherein the notification includes an audible notification, and wherein outputting the notification includes outputting the audible notification using at least one speaker of the vehicle.

Aspect 37: The apparatus of any one of aspects 19 or 36, wherein the apparatus includes a vehicle.

Aspect 38: The apparatus of any one of aspects 19 or 36, wherein the apparatus includes a computing device of a vehicle.

Aspect 39: The apparatus of any one of aspects 19 or 38, further comprising a camera configured to capture the one or more frames.

Aspect 40: The apparatus of any one of aspects 19 or 39, further comprising a display configured to display the one or more frames.

Aspect 41: A non-transitory computer-readable storage medium having stored thereon instructions which, when executed by one or more processors, cause the one or more processors to perform any of the operations of aspects 1 to 40.

Aspect 43: An apparatus comprising means for performing any of the operations of aspects 1 to 40.

What is claimed is:

1. An apparatus for processing one or more frames, comprising:
   a storage device; and
   a processor coupled to the storage device, the processor configured to:
     extract, using a first machine learning model, first one or more features from a first frame, second one or more features from a second frame, and third one or more features from a third frame, the first one or more features, the second one or more features, and the third one or more features being associated with a person driving a vehicle;

store the first one or more features, the second one or more features, and the third one or more features in the storage device;

obtain, from the storage device, the first one or more features, the second one or more features, and the third one or more features;

remove features from the storage device based on storing the third one or more features in the storage device;

process, using a second machine learning model, the first one or more features, the second one or more features, and the third one or more features; and determine, based on processing of the first one or more features, the second one or more features, and the third one or more features using the second machine learning model, at least one activity associated with the person driving the vehicle.

2. The apparatus of claim 1, wherein the first frame occurs before the second frame in a sequence of frames.

3. The apparatus of claim 1, wherein the first one or more features are extracted at a first time and the second one or more features are extracted at a second time occurring after the first time.

4. The apparatus of claim 1, wherein the processor is configured to:
generate a combined feature representation at least in part by combining the first one or more features and the second one or more features;
wherein the at least one activity associated with the person driving the vehicle is determined based on processing of the combined feature representation using the second machine learning model.

5. The apparatus of claim 4, wherein the combined feature representation includes a feature vector.

6. The apparatus of claim 5, wherein the feature vector includes a two-dimensional feature vector.

7. The apparatus of claim 4, wherein, to combine the first one or more features and the second one or more features, the processor is configured to concatenate the first one or more features and the second one or more features.

8. The apparatus of claim 1, wherein the processor is configured to:
generate a combined feature representation at least in part by combining the first one or more features, the second one or more features, and the third one or more features;
wherein the at least one activity associated with the person driving the vehicle is determined based on processing of the combined feature representation using the second machine learning model.

9. The apparatus of claim 1, wherein the processor is configured to:
determine, using the second machine learning model, a classification associated with the first one or more features and the second one or more features, the classification being indicative of the at least one activity.

10. The apparatus of claim 1, wherein the first machine learning model includes a neural network.

11. The apparatus of claim 1, wherein the second machine learning model includes a convolutional neural network.

12. The apparatus of claim 11, wherein the convolutional neural network includes a two-dimensional convolutional neural network.

13. The apparatus of claim 1, wherein the processor is configured to:
output a notification based on the at least one activity.

14. The apparatus of claim 13, wherein the notification includes a visual notification, and wherein outputting the notification includes displaying the visual notification.

15. The apparatus of claim 13, wherein the notification includes an audible notification, and wherein outputting the notification includes outputting the audible notification using at least one speaker of the vehicle.

16. The apparatus of claim 1, wherein the apparatus includes a vehicle.

17. The apparatus of claim 1, wherein the apparatus includes a computing device of a vehicle.

18. The apparatus of claim 1, further comprising a camera configured to capture the one or more frames.

19. The apparatus of claim 1, further comprising a display configured to display the one or more frames.

20. A method of processing one or more frames, the method comprising:
extracting, using a first machine learning model, first one or more features from a first frame, second one or more features from a second frame, and third one or more features from a third frame, the first one or more features, the second one or more features, and the third one or more features being associated with a person driving a vehicle;
storing the first one or more features, the second one or more features, and the third one or more features in a storage device;
obtaining, from the storage device, the first one or more features, the second one or more features, and the third one or more features;
removing features from the storage device based on storing the third one or more features in the storage device;
processing, using a second machine learning model, the first one or more features, the second one or more features, and the third one or more features; and
determining, based on processing of the first one or more features, the second one or more features, and the third one or more features using the second machine learning model, at least one activity associated with the person driving the vehicle.

21. The method of claim 20, wherein the first frame occurs before the second frame in a sequence of frames.

22. The method of claim 20, wherein the first one or more features are extracted at a first time and the second one or more features are extracted at a second time occurring after the first time.

23. The method of claim 20, further comprising:
generating a combined feature representation at least in part by combining the first one or more features and the second one or more features;
wherein the at least one activity associated with the person driving the vehicle is determined based on processing of the combined feature representation using the second machine learning model.

24. The method of claim 23, wherein the combined feature representation includes a two-dimensional feature vector.

25. The method of claim 20, further comprising:
generating a combined feature representation at least in part by combining the first one or more features, the second one or more features, and the third one or more features;
wherein the at least one activity associated with the person driving the vehicle is determined based on processing of the combined feature representation using the second machine learning model.

26. The method of claim 20, further comprising:
determining, using the second machine learning model, a classification associated with the first one or more features and the second one or more features, the classification being indicative of the at least one activity.

27. The method of claim 23, wherein combining the first one or more features and the second one or more features comprises concatenating the first one or more features and the second one or more features.

28. The method of claim 20, further comprising:
outputting a notification based on the at least one activity.

29. The method of claim 28, wherein the notification includes a visual notification, and wherein outputting the notification includes displaying the visual notification.

30. The method of claim 28, wherein the notification includes an audible notification, and wherein outputting the notification includes outputting the audible notification using at least one speaker of the vehicle.

\* \* \* \* \*